United States Patent [19]
Joto et al.

[11] Patent Number: 5,973,675
[45] Date of Patent: Oct. 26, 1999

[54] INFORMATION PROCESSING APPARATUS

[75] Inventors: Takuma Joto, Shiki-gun; Takeshi Sakai, Nara, both of Japan

[73] Assignee: Sharp Kabushiki Kaisha, Osaka, Japan

[21] Appl. No.: 08/858,760

[22] Filed: May 19, 1997

[30] Foreign Application Priority Data

Jun. 13, 1996 [JP] Japan .................................. 8-152736

[51] Int. Cl.$^6$ .................................................. G09G 5/00
[52] U.S. Cl. ............................ 345/168; 345/172; 341/22; 341/26; 364/189
[58] Field of Search .................................. 345/168, 169, 345/172; 341/22, 26; 364/189

[56] References Cited

U.S. PATENT DOCUMENTS

| | | | |
|---|---|---|---|
| 5,450,080 | 9/1995 | Irwin | 341/22 |
| 5,459,462 | 10/1995 | Venkidu et al. | 341/22 |
| 5,610,601 | 3/1997 | Lahti et al. | 341/22 |
| 5,631,643 | 5/1997 | Hisamori et al. | 341/23 |
| 5,717,428 | 2/1998 | Barrus et al. | 345/168 |

FOREIGN PATENT DOCUMENTS

| | | |
|---|---|---|
| 0549242 | 6/1993 | European Pat. Off. . |
| 58-127233 | 7/1983 | Japan . |
| 02004030 | 1/1990 | Japan . |
| 5-61585 | 3/1993 | Japan . |
| 05061585 | 12/1993 | Japan .............................. G06F 3/023 |

*Primary Examiner*—Richard A. Hjerpe
*Assistant Examiner*—Henry N. Tran
*Attorney, Agent, or Firm*—Nixon & Vanderhye P.C.

[57] ABSTRACT

An information processing apparatus is capable of using more than one type of keyboard with a single keyboard controller without increasing the production cost. In a keyboard matrix, a key scanning line C0 is arranged so that the key scanning line C0 is only connected to any one of key return lines R0 to R7 through a key switch having a key switch number G01. The key switch number G01 is assigned for the key [F1] which is common to keyboards having different key arrangements. When the information processing apparatus is activated, a keyboard initializing program is activated by depressing the [F1] key. As a result, the information processing apparatus identifies the type of the keyboard by detecting a key return line R from which a signal is returned when scanning is made upon the depression of the [F1] key.

17 Claims, 24 Drawing Sheets

F I G. 2
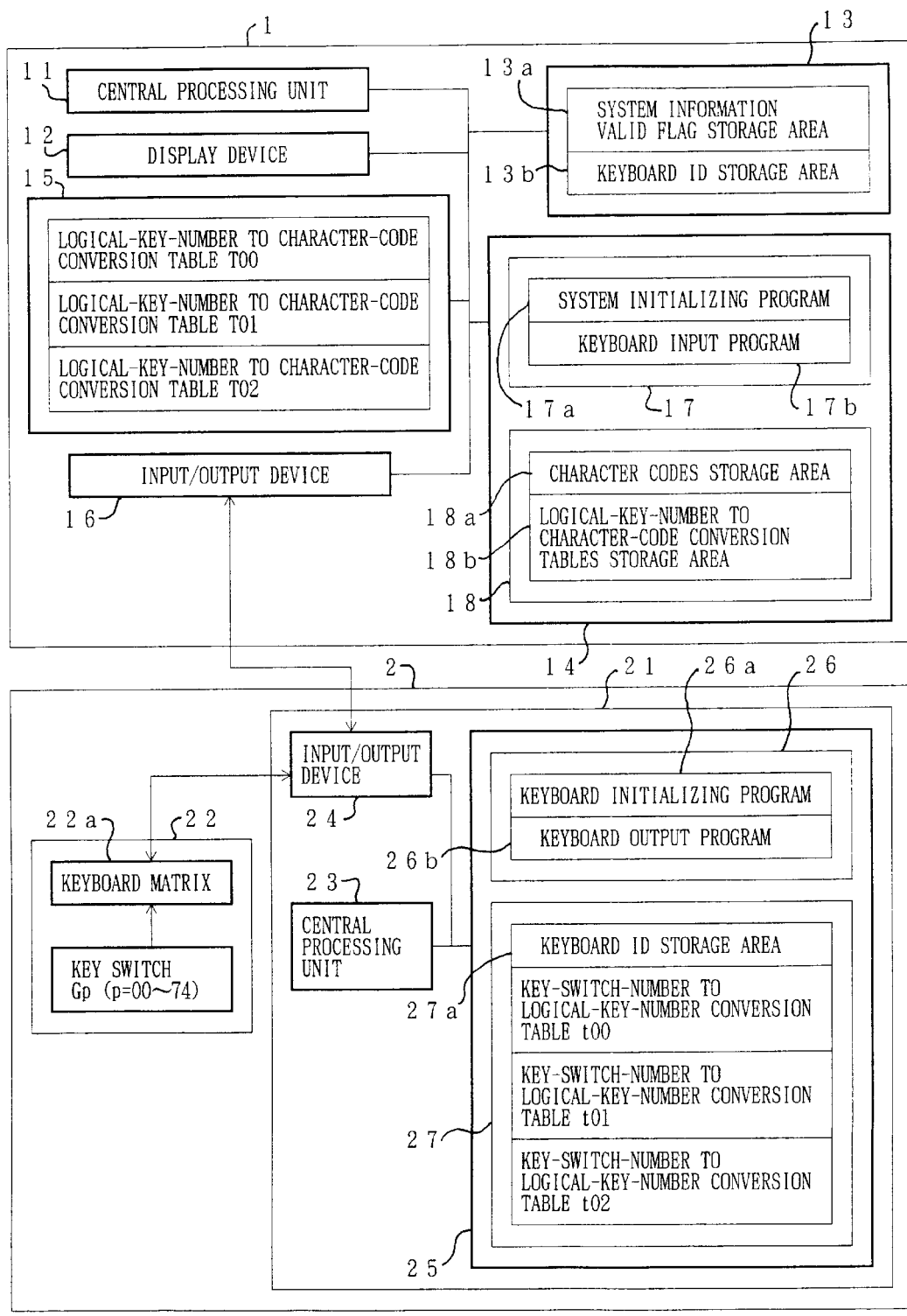

FIG. 4

LOGICAL-KEY-NUMBER TO CHARACTER-CODE CONVERSION TABLE T00

| LOGICAL KEY NUMBER | CHARACTERS PRINTED ON THE TOP OF KEYS | CHARACTER CODE | LOGICAL KEY NUMBER | CHARACTERS PRINTED ON THE TOP OF KEYS | CHARACTER CODE |
|---|---|---|---|---|---|
| K 0 0 | ESC | 1 0 | K 3 8 | [ | 7 3 |
| K 0 1 | F 1 | 1 1 | K 3 9 | ] | 7 4 |
| K 0 2 | F 2 | 1 2 | K 4 0 | \ | 7 5 |
| K 0 3 | F 3 | 1 3 | K 4 1 | CAPS | 2 5 |
| K 0 4 | F 4 | 1 4 | K 4 2 | A | 3 1 |
| K 0 5 | F 5 | 1 5 | K 4 3 | S | 4 9 |
| K 0 6 | F 6 | 1 6 | K 4 4 | D | 3 4 |
| K 0 7 | F 7 | 1 7 | K 4 5 | F | 3 6 |
| K 0 8 | F 8 | 1 8 | K 4 6 | G | 3 7 |
| K 0 9 | F 9 | 1 9 | K 4 7 | H | 3 8 |
| K 1 0 | F 1 0 | 2 0 | K 4 8 | J | 4 0 |
| K 1 1 | F 1 1 | 2 1 | K 4 9 | K | 4 1 |
| K 1 2 | F 1 2 | 2 2 | K 5 0 | L | 4 2 |
| K 1 3 | ~ | 7 0 | K 5 1 | ; | 7 6 |
| K 1 4 | 1 | 6 1 | K 5 2 | ' | 7 7 |
| K 1 5 | 2 | 6 2 | K 5 3 | Enter | 2 6 |
| K 1 6 | 3 | 6 3 | K 5 4 | LEFT SHIFT | 2 7 |
| K 1 7 | 4 | 6 4 | K 5 5 | Z | 5 6 |
| K 1 8 | 5 | 6 5 | K 5 6 | X | 5 4 |
| K 1 9 | 6 | 6 6 | K 5 7 | C | 3 3 |
| K 2 0 | 7 | 6 7 | K 5 8 | V | 5 2 |
| K 2 1 | 8 | 6 8 | K 5 9 | B | 3 2 |
| K 2 2 | 9 | 6 9 | K 6 0 | N | 4 4 |
| K 2 3 | 0 | 6 0 | K 6 1 | M | 4 3 |
| K 2 4 | - | 7 1 | K 6 2 | , | 7 8 |
| K 2 5 | = | 7 2 | K 6 3 | . | 7 9 |
| K 2 6 | BS | 2 3 | K 6 4 | / | 8 0 |
| K 2 7 | TAB | 2 4 | K 6 5 | RIGHT SHIFT | 2 8 |
| K 2 8 | Q | 4 7 | K 6 6 | CTRL | 1 0 0 |
| K 2 9 | W | 5 3 | K 6 7 | ALT | 1 0 1 |
| K 3 0 | E | 3 5 | K 6 8 | SPACE | 1 0 2 |
| K 3 1 | R | 4 8 | K 6 9 | ALT | 1 0 3 |
| K 3 2 | T | 5 0 | K 7 0 | CTRL | 1 0 4 |
| K 3 3 | Y | 5 5 | K 7 1 | UP ARROW | 1 1 0 |
| K 3 4 | U | 5 1 | K 7 2 | LEFT ARROW | 1 1 1 |
| K 3 5 | I | 3 9 | K 7 3 | DOWN ARROW | 1 1 2 |
| K 3 6 | O | 4 5 | K 7 4 | RIGHT ARROW | 1 1 3 |
| K 3 7 | P | 4 6 | | | |

FIG. 5

LOGICAL-KEY-NUMBER TO CHARACTER-CODE CONVERSION TABLE T01

| LOGICAL KEY NUMBER | CHARACTERS PRINTED ON THE TOP OF KEYS | CHARACTER CODE | LOGICAL KEY NUMBER | CHARACTERS PRINTED ON THE TOP OF KEYS | CHARACTER CODE |
|---|---|---|---|---|---|
| K 0 0 | ESC | 1 0 | K 3 8 | Ü | 7 3 |
| K 0 1 | F 1 | 1 1 | K 3 9 | + | 7 4 |
| K 0 2 | F 2 | 1 2 | K 4 0 | # | 7 5 |
| K 0 3 | F 3 | 1 3 | K 4 1 | CAPS | 2 5 |
| K 0 4 | F 4 | 1 4 | K 4 2 | A | 3 1 |
| K 0 5 | F 5 | 1 5 | K 4 3 | S | 4 9 |
| K 0 6 | F 6 | 1 6 | K 4 4 | D | 3 4 |
| K 0 7 | F 7 | 1 7 | K 4 5 | F | 3 6 |
| K 0 8 | F 8 | 1 8 | K 4 6 | G | 3 7 |
| K 0 9 | F 9 | 1 9 | K 4 7 | H | 3 8 |
| K 1 0 | F 1 0 | 2 0 | K 4 8 | J | 4 0 |
| K 1 1 | F 1 1 | 2 1 | K 4 9 | K | 4 1 |
| K 1 2 | F 1 2 | 2 2 | K 5 0 | L | 4 2 |
| K 1 3 | ˆ | 7 0 | K 5 1 | Ö | 7 6 |
| K 1 4 | 1 | 6 1 | K 5 2 | Ä | 7 7 |
| K 1 5 | 2 | 6 2 | K 5 3 | Enter | 2 6 |
| K 1 6 | 3 | 6 3 | K 5 4 | LEFT SHIFT | 2 7 |
| K 1 7 | 4 | 6 4 | K 5 5 | Y | 5 6 |
| K 1 8 | 5 | 6 5 | K 5 6 | X | 5 4 |
| K 1 9 | 6 | 6 6 | K 5 7 | C | 3 3 |
| K 2 0 | 7 | 6 7 | K 5 8 | V | 5 2 |
| K 2 1 | 8 | 6 8 | K 5 9 | B | 3 2 |
| K 2 2 | 9 | 6 9 | K 6 0 | N | 4 4 |
| K 2 3 | 0 | 6 0 | K 6 1 | M | 4 3 |
| K 2 4 | ß | 7 1 | K 6 2 | , | 7 8 |
| K 2 5 | = | 7 2 | K 6 3 | . | 7 9 |
| K 2 6 | BS | 2 3 | K 6 4 | - | 8 0 |
| K 2 7 | TAB | 2 4 | K 6 5 | RIGHT SHIFT | 2 8 |
| K 2 8 | Q | 4 7 | K 6 6 | CTRL | 1 0 0 |
| K 2 9 | W | 5 3 | K 6 7 | ALT | 1 0 1 |
| K 3 0 | E | 3 5 | K 6 8 | SPACE | 1 0 2 |
| K 3 1 | R | 4 8 | K 6 9 | ALT GR | 1 0 5 |
| K 3 2 | T | 5 0 | K 7 0 | CTRL | 1 0 4 |
| K 3 3 | Z | 5 5 | K 7 1 | UP ARROW | 1 1 0 |
| K 3 4 | U | 5 1 | K 7 2 | LEFT ARROW | 1 1 1 |
| K 3 5 | I | 3 9 | K 7 3 | DOWN ARROW | 1 1 2 |
| K 3 6 | O | 4 5 | K 7 4 | RIGHT ARROW | 1 1 3 |
| K 3 7 | P | 4 6 | — | | |

F I G. 6

LOGICAL-KEY-NUMBER TO CHARACTER-CODE CONVERSION TABLE T02

| LOGICAL KEY NUMBER | CHARACTERS PRINTED ON THE TOP OF KEYS | CHARACTER CODE | LOGICAL KEY NUMBER | CHARACTERS PRINTED ON THE TOP OF KEYS | CHARACTER CODE |
|---|---|---|---|---|---|
| K 0 0 | ESC | 1 0 | K 3 8 | ^ | 7 3 |
| K 0 1 | F 1 | 1 1 | K 3 9 | $ | 7 4 |
| K 0 2 | F 2 | 1 2 | K 4 0 | * | 7 5 |
| K 0 3 | F 3 | 1 3 | K 4 1 | CAPS | 2 5 |
| K 0 4 | F 4 | 1 4 | K 4 2 | Q | 3 1 |
| K 0 5 | F 5 | 1 5 | K 4 3 | S | 4 9 |
| K 0 6 | F 6 | 1 6 | K 4 4 | D | 3 4 |
| K 0 7 | F 7 | 1 7 | K 4 5 | F | 3 6 |
| K 0 8 | F 8 | 1 8 | K 4 6 | G | 3 7 |
| K 0 9 | F 9 | 1 9 | K 4 7 | H | 3 8 |
| K 1 0 | F 1 0 | 2 0 | K 4 8 | J | 4 0 |
| K 1 1 | F 1 1 | 2 1 | K 4 9 | K | 4 1 |
| K 1 2 | F 1 2 | 2 2 | K 5 0 | L | 4 2 |
| K 1 3 | ² | 7 0 | K 5 1 | M | 7 6 |
| K 1 4 | 1 | 6 1 | K 5 2 | ' | 7 7 |
| K 1 5 | 2 | 6 2 | K 5 3 | Enter | 2 6 |
| K 1 6 | 3 | 6 3 | K 5 4 | LEFT SHIFT | 2 7 |
| K 1 7 | 4 | 6 4 | K 5 5 | W | 5 6 |
| K 1 8 | 5 | 6 5 | K 5 6 | X | 5 4 |
| K 1 9 | 6 | 6 6 | K 5 7 | C | 3 3 |
| K 2 0 | 7 | 6 7 | K 5 8 | V | 5 2 |
| K 2 1 | 8 | 6 8 | K 5 9 | B | 3 2 |
| K 2 2 | 9 | 6 9 | K 6 0 | N | 4 4 |
| K 2 3 | 0 | 6 0 | K 6 1 | , | 4 3 |
| K 2 4 | - | 7 1 | K 6 2 | ; | 7 8 |
| K 2 5 | = | 7 2 | K 6 3 | : | 7 9 |
| K 2 6 | BS | 2 3 | K 6 4 | ! | 8 0 |
| K 2 7 | TAB | 2 4 | K 6 5 | RIGHT SHIFT | 2 8 |
| K 2 8 | A | 4 7 | K 6 6 | CTRL | 1 0 0 |
| K 2 9 | Z | 5 3 | K 6 7 | ALT | 1 0 1 |
| K 3 0 | E | 3 5 | K 6 8 | SPACE | 1 0 2 |
| K 3 1 | R | 4 8 | K 6 9 | ALT GR | 1 0 5 |
| K 3 2 | T | 5 0 | K 7 0 | CTRL | 1 0 4 |
| K 3 3 | Y | 5 5 | K 7 1 | UP ARROW | 1 1 0 |
| K 3 4 | U | 5 1 | K 7 2 | LEFT ARROW | 1 1 1 |
| K 3 5 | I | 3 9 | K 7 3 | DOWN ARROW | 1 1 2 |
| K 3 6 | O | 4 5 | K 7 4 | RIGHT ARROW | 1 1 3 |
| K 3 7 | P | 4 6 | — | | |

FIG. 7

KEY-SWITCH-NUMBER TO LOGICAL-KEY-NUMBER CONVERSION TABLE t00

| KEY SWITCH POSITION | KEY SWITCH NUMBER | LOGICAL KEY NUMBER | KEY SWITCH POSITION | KEY SWITCH NUMBER | LOGICAL KEY NUMBER |
|---|---|---|---|---|---|
| C 0 R 0 | G 0 1 | K 0 1 | C 5 R 4 | G 3 6 | K 3 6 |
| C 0 R 1 | — | — | C 5 R 5 | G 3 7 | K 3 7 |
| C 0 R 2 | — | — | C 5 R 6 | G 3 8 | K 3 8 |
| C 0 R 3 | — | — | C 5 R 7 | G 3 9 | K 3 9 |
| C 0 R 4 | — | — | C 6 R 0 | G 4 0 | K 4 0 |
| C 0 R 5 | — | — | C 6 R 1 | G 4 1 | K 4 1 |
| C 0 R 6 | — | — | C 6 R 2 | G 4 2 | K 4 2 |
| C 0 R 7 | — | — | C 6 R 3 | G 4 3 | K 4 3 |
| C 1 R 0 | G 0 0 | K 0 0 | C 6 R 4 | G 4 4 | K 4 4 |
| C 1 R 1 | — | — | C 6 R 5 | G 4 5 | K 4 5 |
| C 1 R 2 | G 0 2 | K 0 2 | C 6 R 6 | G 4 6 | K 4 6 |
| C 1 R 3 | G 0 3 | K 0 3 | C 6 R 7 | G 4 7 | K 4 7 |
| C 1 R 4 | G 0 4 | K 0 4 | C 7 R 0 | G 4 8 | K 4 8 |
| C 1 R 5 | G 0 5 | K 0 5 | C 7 R 1 | G 4 9 | K 4 9 |
| C 1 R 6 | G 0 6 | K 0 6 | C 7 R 2 | G 5 0 | K 5 0 |
| C 1 R 7 | G 0 7 | K 0 7 | C 7 R 3 | G 5 1 | K 5 1 |
| C 2 R 0 | G 0 8 | K 0 8 | C 7 R 4 | G 5 2 | K 5 2 |
| C 2 R 1 | G 0 9 | K 0 9 | C 7 R 5 | G 5 3 | K 5 3 |
| C 2 R 2 | G 1 0 | K 1 0 | C 7 R 6 | G 5 4 | K 5 4 |
| C 2 R 3 | G 1 1 | K 1 1 | C 7 R 7 | G 5 5 | K 5 5 |
| C 2 R 4 | G 1 2 | K 1 2 | C 8 R 0 | G 5 6 | K 5 6 |
| C 2 R 5 | G 1 3 | K 1 3 | C 8 R 1 | G 5 7 | K 5 7 |
| C 2 R 6 | G 1 4 | K 1 4 | C 8 R 2 | G 5 8 | K 5 8 |
| C 2 R 7 | G 1 5 | K 1 5 | C 8 R 3 | G 5 9 | K 5 9 |
| C 3 R 0 | G 1 6 | K 1 6 | C 8 R 4 | G 6 0 | K 6 0 |
| C 3 R 1 | G 1 7 | K 1 7 | C 8 R 5 | G 6 1 | K 6 1 |
| C 3 R 2 | G 1 8 | K 1 8 | C 8 R 6 | G 6 2 | K 6 2 |
| C 3 R 3 | G 1 9 | K 1 9 | C 8 R 7 | G 6 3 | K 6 3 |
| C 3 R 4 | G 2 0 | K 2 0 | C 9 R 0 | G 6 4 | K 6 4 |
| C 3 R 5 | G 2 1 | K 2 1 | C 9 R 1 | G 6 5 | K 6 5 |
| C 3 R 6 | G 2 2 | K 2 2 | C 9 R 2 | G 6 6 | K 6 6 |
| C 3 R 7 | G 2 3 | K 2 3 | C 9 R 3 | G 6 7 | K 6 7 |
| C 4 R 0 | G 2 4 | K 2 4 | C 9 R 4 | G 6 8 | K 6 8 |
| C 4 R 1 | G 2 5 | K 2 5 | C 9 R 5 | G 6 9 | K 6 9 |
| C 4 R 2 | G 2 6 | K 2 6 | C 9 R 6 | G 7 0 | K 7 0 |
| C 4 R 3 | G 2 7 | K 2 7 | C 9 R 7 | G 7 1 | K 7 1 |
| C 4 R 4 | G 2 8 | K 2 8 | C 10 R 0 | G 7 2 | K 7 2 |
| C 4 R 5 | G 2 9 | K 2 9 | C 10 R 1 | G 7 3 | K 7 3 |
| C 4 R 6 | G 3 0 | K 3 0 | C 10 R 2 | G 7 4 | K 7 4 |
| C 4 R 7 | G 3 1 | K 3 1 | C 10 R 3 | — | — |
| C 5 R 0 | G 3 2 | K 3 2 | C 10 R 4 | — | — |
| C 5 R 1 | G 3 3 | K 3 3 | C 10 R 5 | — | — |
| C 5 R 2 | G 3 4 | K 3 4 | C 10 R 6 | — | — |
| C 5 R 3 | G 3 5 | K 3 5 | C 10 R 7 | — | — |

FIG. 8

KEY-SWITCH-NUMBER TO LOGICAL-KEY-NUMBER CONVERSION TABLE t01

| KEY SWITCH POSITION | KEY SWITCH NUMBER | LOGICAL KEY NUMBER | KEY SWITCH POSITION | KEY SWITCH NUMBER | LOGICAL KEY NUMBER |
|---|---|---|---|---|---|
| C0R0 | — | — | C5R4 | G36 | K36 |
| C0R1 | G01 | K01 | C5R5 | G37 | K37 |
| C0R2 | — | — | C5R6 | G38 | K38 |
| C0R3 | — | — | C5R7 | G39 | K39 |
| C0R4 | — | — | C6R0 | G40 | K40 |
| C0R5 | — | — | C6R1 | G41 | K41 |
| C0R6 | — | — | C6R2 | G42 | K42 |
| C0R7 | — | — | C6R3 | G43 | K43 |
| C1R0 | G00 | K00 | C6R4 | G44 | K44 |
| C1R1 | — | — | C6R5 | G45 | K45 |
| C1R2 | G02 | K02 | C6R6 | G46 | K46 |
| C1R3 | G03 | K03 | C6R7 | G47 | K47 |
| C1R4 | G04 | K04 | C7R0 | G48 | K48 |
| C1R5 | G05 | K05 | C7R1 | G49 | K49 |
| C1R6 | G06 | K06 | C7R2 | G50 | K50 |
| C1R7 | G07 | K07 | C7R3 | G51 | K51 |
| C2R0 | G08 | K08 | C7R4 | G52 | K52 |
| C2R1 | G09 | K09 | C7R5 | G53 | K53 |
| C2R2 | G10 | K10 | C7R6 | G54 | K54 |
| C2R3 | G11 | K11 | C7R7 | G55 | K55 |
| C2R4 | G12 | K12 | C8R0 | G56 | K56 |
| C2R5 | G13 | K13 | C8R1 | G57 | K57 |
| C2R6 | G14 | K14 | C8R2 | G58 | K58 |
| C2R7 | G15 | K15 | C8R3 | G59 | K59 |
| C3R0 | G16 | K16 | C8R4 | G60 | K60 |
| C3R1 | G17 | K17 | C8R5 | G61 | K61 |
| C3R2 | G18 | K18 | C8R6 | G62 | K62 |
| C3R3 | G19 | K19 | C8R7 | G63 | K63 |
| C3R4 | G20 | K20 | C9R0 | G64 | K64 |
| C3R5 | G21 | K21 | C9R1 | G65 | K65 |
| C3R6 | G22 | K22 | C9R2 | G66 | K66 |
| C3R7 | G23 | K23 | C9R3 | G67 | K67 |
| C4R0 | G24 | K24 | C9R4 | G68 | K68 |
| C4R1 | G25 | K25 | C9R5 | G69 | K69 |
| C4R2 | G26 | K26 | C9R6 | G70 | K70 |
| C4R3 | G27 | K27 | C9R7 | G71 | K71 |
| C4R4 | G28 | K28 | C10R0 | G72 | K72 |
| C4R5 | G29 | K29 | C10R1 | G73 | K73 |
| C4R6 | G30 | K30 | C10R2 | G74 | K74 |
| C4R7 | G31 | K31 | C10R3 | — | — |
| C5R0 | G32 | K32 | C10R4 | — | — |
| C5R1 | G33 | K33 | C10R5 | — | — |
| C5R2 | G34 | K34 | C10R6 | — | — |
| C5R3 | G35 | K35 | C10R7 | — | — |

FIG. 9

KEY-SWITCH-NUMBER TO LOGICAL-KEY-NUMBER CONVERSION TABLE t02

| KEY SWITCH POSITION | KEY SWITCH NUMBER | LOGICAL KEY NUMBER | KEY SWITCH POSITION | KEY SWITCH NUMBER | LOGICAL KEY NUMBER |
|---|---|---|---|---|---|
| C 0 R 0 | — | — | C 5 R 4 | G 3 6 | K 3 6 |
| C 0 R 1 | — | — | C 5 R 5 | G 3 7 | K 3 7 |
| C 0 R 2 | G 0 1 | K 0 1 | C 5 R 6 | G 3 8 | K 3 8 |
| C 0 R 3 | — | — | C 5 R 7 | G 3 9 | K 3 9 |
| C 0 R 4 | — | — | C 6 R 0 | G 4 0 | K 4 0 |
| C 0 R 5 | — | — | C 6 R 1 | G 4 1 | K 4 1 |
| C 0 R 6 | — | — | C 6 R 2 | G 4 2 | K 4 2 |
| C 0 R 7 | — | — | C 6 R 3 | G 4 3 | K 4 3 |
| C 1 R 0 | G 0 0 | K 0 0 | C 6 R 4 | G 4 4 | K 4 4 |
| C 1 R 1 | — | — | C 6 R 5 | G 4 5 | K 4 5 |
| C 1 R 2 | G 0 2 | K 0 2 | C 6 R 6 | G 4 6 | K 4 6 |
| C 1 R 3 | G 0 3 | K 0 3 | C 6 R 7 | G 4 7 | K 4 7 |
| C 1 R 4 | G 0 4 | K 0 4 | C 7 R 0 | G 4 8 | K 4 8 |
| C 1 R 5 | G 0 5 | K 0 5 | C 7 R 1 | G 4 9 | K 4 9 |
| C 1 R 6 | G 0 6 | K 0 6 | C 7 R 2 | G 5 0 | K 5 0 |
| C 1 R 7 | G 0 7 | K 0 7 | C 7 R 3 | G 5 1 | K 5 1 |
| C 2 R 0 | G 0 8 | K 0 8 | C 7 R 4 | G 5 2 | K 5 2 |
| C 2 R 1 | G 0 9 | K 0 9 | C 7 R 5 | G 5 3 | K 5 3 |
| C 2 R 2 | G 1 0 | K 1 0 | C 7 R 6 | G 5 4 | K 5 4 |
| C 2 R 3 | G 1 1 | K 1 1 | C 7 R 7 | G 5 5 | K 5 5 |
| C 2 R 4 | G 1 2 | K 1 2 | C 8 R 0 | G 5 6 | K 5 6 |
| C 2 R 5 | G 1 3 | K 1 3 | C 8 R 1 | G 5 7 | K 5 7 |
| C 2 R 6 | G 1 4 | K 1 4 | C 8 R 2 | G 5 8 | K 5 8 |
| C 2 R 7 | G 1 5 | K 1 5 | C 8 R 3 | G 5 9 | K 5 9 |
| C 3 R 0 | G 1 6 | K 1 6 | C 8 R 4 | G 6 0 | K 6 0 |
| C 3 R 1 | G 1 7 | K 1 7 | C 8 R 5 | G 6 1 | K 6 1 |
| C 3 R 2 | G 1 8 | K 1 8 | C 8 R 6 | G 6 2 | K 6 2 |
| C 3 R 3 | G 1 9 | K 1 9 | C 8 R 7 | G 6 3 | K 6 3 |
| C 3 R 4 | G 2 0 | K 2 0 | C 9 R 0 | G 6 4 | K 6 4 |
| C 3 R 5 | G 2 1 | K 2 1 | C 9 R 1 | G 6 5 | K 6 5 |
| C 3 R 6 | G 2 2 | K 2 2 | C 9 R 2 | G 6 6 | K 6 6 |
| C 3 R 7 | G 2 3 | K 2 3 | C 9 R 3 | G 6 7 | K 6 7 |
| C 4 R 0 | G 2 4 | K 2 4 | C 9 R 4 | G 6 8 | K 6 8 |
| C 4 R 1 | G 2 5 | K 2 5 | C 9 R 5 | G 6 9 | K 6 9 |
| C 4 R 2 | G 2 6 | K 2 6 | C 9 R 6 | G 7 0 | K 7 0 |
| C 4 R 3 | G 2 7 | K 2 7 | C 9 R 7 | G 7 1 | K 7 1 |
| C 4 R 4 | G 2 8 | K 2 8 | C 10 R 0 | G 7 2 | K 7 2 |
| C 4 R 5 | G 2 9 | K 2 9 | C 10 R 1 | G 7 3 | K 7 3 |
| C 4 R 6 | G 3 0 | K 3 0 | C 10 R 2 | G 7 4 | K 7 4 |
| C 4 R 7 | G 3 1 | K 3 1 | C 10 R 3 | — | — |
| C 5 R 0 | G 3 2 | K 3 2 | C 10 R 4 | — | — |
| C 5 R 1 | G 3 3 | K 3 3 | C 10 R 5 | — | — |
| C 5 R 2 | G 3 4 | K 3 4 | C 10 R 6 | — | — |
| C 5 R 3 | G 3 5 | K 3 5 | C 10 R 7 | — | — |

FIG. 21

KEY-SWITCH-NUMBER TO LOGICAL-KEY-NUMBER CONVERSION TABLE t00'

| KEY SWITCH POSITION | KEY SWITCH NUMBER | LOGICAL KEY NUMBER | KEY SWITCH POSITION | KEY SWITCH NUMBER | LOGICAL KEY NUMBER |
|---|---|---|---|---|---|
| C 0 R 0 | G 0 0 | K 0 0 | C 5 R 0 | G 4 0 | K 4 0 |
| C 0 R 1 | G 0 1 | K 0 1 | C 5 R 1 | G 4 1 | K 4 1 |
| C 0 R 2 | G 0 2 | K 0 2 | C 5 R 2 | G 4 2 | K 4 2 |
| C 0 R 3 | G 0 3 | K 0 3 | C 5 R 3 | G 4 3 | K 4 3 |
| C 0 R 4 | G 0 4 | K 0 4 | C 5 R 4 | G 4 4 | K 4 4 |
| C 0 R 5 | G 0 5 | K 0 5 | C 5 R 5 | G 4 5 | K 4 5 |
| C 0 R 6 | G 0 6 | K 0 6 | C 5 R 6 | G 4 6 | K 4 6 |
| C 0 R 7 | G 0 7 | K 0 7 | C 5 R 7 | G 4 7 | K 4 7 |
| C 1 R 0 | G 0 8 | K 0 8 | C 6 R 0 | G 4 8 | K 4 8 |
| C 1 R 1 | G 0 9 | K 0 9 | C 6 R 1 | G 4 9 | K 4 9 |
| C 1 R 2 | G 1 0 | K 1 0 | C 6 R 2 | G 5 0 | K 5 0 |
| C 1 R 3 | G 1 1 | K 1 1 | C 6 R 3 | G 5 1 | K 5 1 |
| C 1 R 4 | G 1 2 | K 1 2 | C 6 R 4 | G 5 2 | K 5 2 |
| C 1 R 5 | G 1 3 | K 1 3 | C 6 R 5 | G 5 3 | K 5 3 |
| C 1 R 6 | G 1 4 | K 1 4 | C 6 R 6 | G 5 4 | K 5 4 |
| C 1 R 7 | G 1 5 | K 1 5 | C 6 R 7 | G 5 5 | K 5 5 |
| C 2 R 0 | G 1 6 | K 1 6 | C 7 R 0 | G 5 6 | K 5 6 |
| C 2 R 1 | G 1 7 | K 1 7 | C 7 R 1 | G 5 7 | K 5 7 |
| C 2 R 2 | G 1 8 | K 1 8 | C 7 R 2 | G 5 8 | K 5 8 |
| C 2 R 3 | G 1 9 | K 1 9 | C 7 R 3 | G 5 9 | K 5 9 |
| C 2 R 4 | G 2 0 | K 2 0 | C 7 R 4 | G 6 0 | K 6 0 |
| C 2 R 5 | G 2 1 | K 2 1 | C 7 R 5 | G 6 1 | K 6 1 |
| C 2 R 6 | G 2 2 | K 2 2 | C 7 R 6 | G 6 2 | K 6 2 |
| C 2 R 7 | G 2 3 | K 2 3 | C 7 R 7 | G 6 3 | K 6 3 |
| C 3 R 0 | G 2 4 | K 2 4 | C 8 R 0 | G 6 4 | K 6 4 |
| C 3 R 1 | G 2 5 | K 2 5 | C 8 R 1 | G 6 5 | K 6 5 |
| C 3 R 2 | G 2 6 | K 2 6 | C 8 R 2 | G 6 6 | K 6 6 |
| C 3 R 3 | G 2 7 | K 2 7 | C 8 R 3 | G 6 7 | K 6 7 |
| C 3 R 4 | G 2 8 | K 2 8 | C 8 R 4 | G 6 8 | K 6 8 |
| C 3 R 5 | G 2 9 | K 2 9 | C 8 R 5 | G 6 9 | K 6 9 |
| C 3 R 6 | G 3 0 | K 3 0 | C 8 R 6 | G 7 0 | K 7 0 |
| C 3 R 7 | G 3 1 | K 3 1 | C 8 R 7 | G 7 1 | K 7 1 |
| C 4 R 0 | G 3 2 | K 3 2 | C 9 R 0 | G 7 2 | K 7 2 |
| C 4 R 1 | G 3 3 | K 3 3 | C 9 R 1 | G 7 3 | K 7 3 |
| C 4 R 2 | G 3 4 | K 3 4 | C 9 R 2 | G 7 4 | K 7 4 |
| C 4 R 3 | G 3 5 | K 3 5 | — | — | — |
| C 4 R 4 | G 3 6 | K 3 6 | — | — | — |
| C 4 R 5 | G 3 7 | K 3 7 | — | — | — |
| C 4 R 6 | G 3 8 | K 3 8 | — | — | — |
| C 4 R 7 | G 3 9 | K 3 9 | — | — | — |

FIG. 22

KEY-SWITCH-NUMBER TO LOGICAL-KEY-NUMBER CONVERSION TABLE t01'

| KEY SWITCH POSITION | KEY SWITCH NUMBER | LOGICAL KEY NUMBER | KEY SWITCH POSITION | KEY SWITCH NUMBER | LOGICAL KEY NUMBER |
|---|---|---|---|---|---|
| C 0 R 0 | G 0 0 | K 0 0 | C 5 R 0 | G 4 0 | K 4 0 |
| C 0 R 1 | G 0 1 | K 0 2 | C 5 R 1 | G 4 1 | K 4 1 |
| C 0 R 2 | G 0 2 | K 0 1 | C 5 R 2 | G 4 2 | K 4 2 |
| C 0 R 3 | G 0 3 | K 0 3 | C 5 R 3 | G 4 3 | K 4 3 |
| C 0 R 4 | G 0 4 | K 0 4 | C 5 R 4 | G 4 4 | K 4 4 |
| C 0 R 5 | G 0 5 | K 0 5 | C 5 R 5 | G 4 5 | K 4 5 |
| C 0 R 6 | G 0 6 | K 0 6 | C 5 R 6 | G 4 6 | K 4 6 |
| C 0 R 7 | G 0 7 | K 0 7 | C 5 R 7 | G 4 7 | K 4 7 |
| C 1 R 0 | G 0 8 | K 0 8 | C 6 R 0 | G 4 8 | K 4 8 |
| C 1 R 1 | G 0 9 | K 0 9 | C 6 R 1 | G 4 9 | K 4 9 |
| C 1 R 2 | G 1 0 | K 1 0 | C 6 R 2 | G 5 0 | K 5 0 |
| C 1 R 3 | G 1 1 | K 1 1 | C 6 R 3 | G 5 1 | K 5 1 |
| C 1 R 4 | G 1 2 | K 1 2 | C 6 R 4 | G 5 2 | K 5 2 |
| C 1 R 5 | G 1 3 | K 1 3 | C 6 R 5 | G 5 3 | K 5 3 |
| C 1 R 6 | G 1 4 | K 1 4 | C 6 R 6 | G 5 4 | K 5 4 |
| C 1 R 7 | G 1 5 | K 1 5 | C 6 R 7 | G 5 5 | K 5 5 |
| C 2 R 0 | G 1 6 | K 1 6 | C 7 R 0 | G 5 6 | K 5 6 |
| C 2 R 1 | G 1 7 | K 1 7 | C 7 R 1 | G 5 7 | K 5 7 |
| C 2 R 2 | G 1 8 | K 1 8 | C 7 R 2 | G 5 8 | K 5 8 |
| C 2 R 3 | G 1 9 | K 1 9 | C 7 R 3 | G 5 9 | K 5 9 |
| C 2 R 4 | G 2 0 | K 2 0 | C 7 R 4 | G 6 0 | K 6 0 |
| C 2 R 5 | G 2 1 | K 2 1 | C 7 R 5 | G 6 1 | K 6 1 |
| C 2 R 6 | G 2 2 | K 2 2 | C 7 R 6 | G 6 2 | K 6 2 |
| C 2 R 7 | G 2 3 | K 2 3 | C 7 R 7 | G 6 3 | K 6 3 |
| C 3 R 0 | G 2 4 | K 2 4 | C 8 R 0 | G 6 4 | K 6 4 |
| C 3 R 1 | G 2 5 | K 2 5 | C 8 R 1 | G 6 5 | K 6 5 |
| C 3 R 2 | G 2 6 | K 2 6 | C 8 R 2 | G 6 6 | K 6 6 |
| C 3 R 3 | G 2 7 | K 2 7 | C 8 R 3 | G 6 7 | K 6 7 |
| C 3 R 4 | G 2 8 | K 2 8 | C 8 R 4 | G 6 8 | K 6 8 |
| C 3 R 5 | G 2 9 | K 2 9 | C 8 R 5 | G 6 9 | K 6 9 |
| C 3 R 6 | G 3 0 | K 3 0 | C 8 R 6 | G 7 0 | K 7 0 |
| C 3 R 7 | G 3 1 | K 3 1 | C 8 R 7 | G 7 1 | K 7 1 |
| C 4 R 0 | G 3 2 | K 3 2 | C 9 R 0 | G 7 2 | K 7 2 |
| C 4 R 1 | G 3 3 | K 3 3 | C 9 R 1 | G 7 3 | K 7 3 |
| C 4 R 2 | G 3 4 | K 3 4 | C 9 R 2 | G 7 4 | K 7 4 |
| C 4 R 3 | G 3 5 | K 3 5 | — | — | — |
| C 4 R 4 | G 3 6 | K 3 6 | — | — | — |
| C 4 R 5 | G 3 7 | K 3 7 | — | — | — |
| C 4 R 6 | G 3 8 | K 3 8 | — | — | — |
| C 4 R 7 | G 3 9 | K 3 9 | — | — | — |

FIG. 23

KEY-SWITCH-NUMBER TO LOGICAL-KEY-NUMBER CONVERSION TABLE t02'

| KEY SWITCH POSITION | KEY SWITCH NUMBER | LOGICAL KEY NUMBER | KEY SWITCH POSITION | KEY SWITCH NUMBER | LOGICAL KEY NUMBER |
|---|---|---|---|---|---|
| C 0 R 0 | G 0 0 | K 0 0 | C 5 R 0 | G 4 0 | K 4 0 |
| C 0 R 1 | G 0 1 | K 0 3 | C 5 R 1 | G 4 1 | K 4 1 |
| C 0 R 2 | G 0 2 | K 0 2 | C 5 R 2 | G 4 2 | K 4 2 |
| C 0 R 3 | G 0 3 | K 0 1 | C 5 R 3 | G 4 3 | K 4 3 |
| C 0 R 4 | G 0 4 | K 0 4 | C 5 R 4 | G 4 4 | K 4 4 |
| C 0 R 5 | G 0 5 | K 0 5 | C 5 R 5 | G 4 5 | K 4 5 |
| C 0 R 6 | G 0 6 | K 0 6 | C 5 R 6 | G 4 6 | K 4 6 |
| C 0 R 7 | G 0 7 | K 0 7 | C 5 R 7 | G 4 7 | K 4 7 |
| C 1 R 0 | G 0 8 | K 0 8 | C 6 R 0 | G 4 8 | K 4 8 |
| C 1 R 1 | G 0 9 | K 0 9 | C 6 R 1 | G 4 9 | K 4 9 |
| C 1 R 2 | G 1 0 | K 1 0 | C 6 R 2 | G 5 0 | K 5 0 |
| C 1 R 3 | G 1 1 | K 1 1 | C 6 R 3 | G 5 1 | K 5 1 |
| C 1 R 4 | G 1 2 | K 1 2 | C 6 R 4 | G 5 2 | K 5 2 |
| C 1 R 5 | G 1 3 | K 1 3 | C 6 R 5 | G 5 3 | K 5 3 |
| C 1 R 6 | G 1 4 | K 1 4 | C 6 R 6 | G 5 4 | K 5 4 |
| C 1 R 7 | G 1 5 | K 1 5 | C 6 R 7 | G 5 5 | K 5 5 |
| C 2 R 0 | G 1 6 | K 1 6 | C 7 R 0 | G 5 6 | K 5 6 |
| C 2 R 1 | G 1 7 | K 1 7 | C 7 R 1 | G 5 7 | K 5 7 |
| C 2 R 2 | G 1 8 | K 1 8 | C 7 R 2 | G 5 8 | K 5 8 |
| C 2 R 3 | G 1 9 | K 1 9 | C 7 R 3 | G 5 9 | K 5 9 |
| C 2 R 4 | G 2 0 | K 2 0 | C 7 R 4 | G 6 0 | K 6 0 |
| C 2 R 5 | G 2 1 | K 2 1 | C 7 R 5 | G 6 1 | K 6 1 |
| C 2 R 6 | G 2 2 | K 2 2 | C 7 R 6 | G 6 2 | K 6 2 |
| C 2 R 7 | G 2 3 | K 2 3 | C 7 R 7 | G 6 3 | K 6 3 |
| C 3 R 0 | G 2 4 | K 2 4 | C 8 R 0 | G 6 4 | K 6 4 |
| C 3 R 1 | G 2 5 | K 2 5 | C 8 R 1 | G 6 5 | K 6 5 |
| C 3 R 2 | G 2 6 | K 2 6 | C 8 R 2 | G 6 6 | K 6 6 |
| C 3 R 3 | G 2 7 | K 2 7 | C 8 R 3 | G 6 7 | K 6 7 |
| C 3 R 4 | G 2 8 | K 2 8 | C 8 R 4 | G 6 8 | K 6 8 |
| C 3 R 5 | G 2 9 | K 2 9 | C 8 R 5 | G 6 9 | K 6 9 |
| C 3 R 6 | G 3 0 | K 3 0 | C 8 R 6 | G 7 0 | K 7 0 |
| C 3 R 7 | G 3 1 | K 3 1 | C 8 R 7 | G 7 1 | K 7 1 |
| C 4 R 0 | G 3 2 | K 3 2 | C 9 R 0 | G 7 2 | K 7 2 |
| C 4 R 1 | G 3 3 | K 3 3 | C 9 R 1 | G 7 3 | K 7 3 |
| C 4 R 2 | G 3 4 | K 3 4 | C 9 R 2 | G 7 4 | K 7 4 |
| C 4 R 3 | G 3 5 | K 3 5 | — | — | — |
| C 4 R 4 | G 3 6 | K 3 6 | — | — | — |
| C 4 R 5 | G 3 7 | K 3 7 | — | — | — |
| C 4 R 6 | G 3 8 | K 3 8 | — | — | — |
| C 4 R 7 | G 3 9 | K 3 9 | — | — | — |

INFORMATION PROCESSING APPARATUS

FIELD OF THE INVENTION

The present invention relates to information processing apparatuses, such as personal computers, word processors, and pocket-sized computers, including a keyboard device as input means.

BACKGROUND OF THE INVENTION

As input means for entering user's instructions to controllers like personal computers and word processors, a keyboard device is generally used. There are other types of input means, such as a voice input system and a touch panel. However, when inputting a large number of characters, for example, texts and programs, it would be said that the keyboard device is still the best input means.

In the keyboard device, a plurality of keys are usually arranged to correspond to characters, respectively. The keyboard device is formed by a keyboard and a keyboard controller. The keyboard has key switches which correspond to the respective keys and are arranged in a matrix form. When a key on the keyboard is depressed, a key switch corresponding to the depressed key is turned on. Then, the keyboard controller outputs a logical key number corresponding to this key switch as a signal.

However, since each country has its own standards, various types of keyboards exist. For example, there are variations in the characters printed on the top of the keys and in the arrangement of the keyboard matrix.

In general, a keyboard controller is produced to correspond to a particular keyboard. Thus, even if a keyboard device is electrically and mechanically compatible with a keyboard having another arrangement of keys, when the keyboard device is connected to the keyboard controller by only replacing the keyboard, signals corresponding to correct logical key numbers cannot be output.

Therefore, in apparatuses like information processing apparatuses including a keyboard device, when the need to replace the keyboard with a keyboard having another arrangement of keys arises, it is impossible to replace only the keyboard. Namely, it is necessary to replace the whole keyboard device as a unit for the replacement of the keyboard. Such a drawback results in poor development efficiency and high development costs.

In order to solve these problems, for example, Japanese Publication for Unexamined Patent Application No. 61585/1993 (Tokukaihei 5-61585) proposes an "information processing apparatus".

In the information processing apparatus disclosed in this publication, an ID memory section storing ID for distinguishing keyboards is included in a keyboard device formed by a keyboard and a controller for outputting key code signals corresponding to the respective key switches of the keyboard. A memory in the information processing apparatus includes, for example, key-code-signal to character-code conversion tables corresponding to a plurality of keyboards. The information processing apparatus reads the ID of a keyboard from the ID memory section, and accepts inputs from the keyboard through the key-code-signal to character-code conversion tables. Consequently, when an occasion to connect a newly developed keyboard to the controller arises, it is possible to use the new keyboard with the use of a conventional controller by storing a key-code-signal to character-code conversion table corresponding to the new keyboard in the memory and reading the key-code-signal to character-code conversion table in accordance with the ID of the new keyboard.

The following description will briefly explain the structure and operation for distinguishing keyboards by presenting an example of a conventional information processing apparatus having storage means for storing a plurality of conversion tables corresponding to keyboards outside of the keyboard controller like the apparatus disclosed in the above-mentioned publication.

As illustrated in FIG. 24, this information processing apparatus includes a system device 51, and a keyboard device 52. The system device 51 includes a central processing unit 53, a display device 54, a system information memory device 55 formed by an EEPROM, FLASHROM, non-volatile RAM, or the like, a main memory 56 formed by a read/write RAM, a secondary memory 57 formed by HDD, etc., and an input/output device 58 for managing the flow of signals between the constitutional elements of the keyboard device 52 and the system device 51.

The system information memory device 55 includes a system information valid flag storage area 55a for storing a system information valid flag (hereinafter just referred to as the flag) L for determining whether initialization of the keyboard is to be performed or not, and a keyboard ID storage area 55b for storing the recognized keyboard ID from the keyboard device 52. The flag L is arranged to be 1 (L=1) after the completion of the execution of a keyboard initializing program 66a which is called up from a system initializing program 59a, to be described later, when the power supply of the system is first switched on. More specifically, the system device 51 judges that the system information is invalid when L=0, and that the system information is valid when L=1. When L=1, the system device 51 performs the following operations. The keyboard ID is a unique number allotted to each keyboard device 52 and the number varies according to the types of keyboards so that the system device 51 can identify the types of keyboards.

The main memory 56 includes a program storage area 59 storing the system initializing program 59a for initializing the system setup and a keyboard input program 59b for converting a logical key number input to the keyboard device 52 into a character code, and a data storage area 60 formed by a character codes storage area 60a and a conversion tables storage area 60b storing logical-key-number to character-code conversion tables.

The secondary memory 57 stores a plurality of logical-key-number to character-code conversion tables T (hereinafter referred to as the "conversion tables T") corresponding to different keyboard ID values. Like the embodiments of the present invention, to be described later, three conversion tables T00 to T02 corresponding to three types of keyboards are provided as shown in FIG. 24.

The keyboard device 52 is formed by a keyboard controller 61 and a keyboard 62. The keyboard controller 61 is formed by a central processing unit 63, an input/output device 64 for managing the flow of signals between the constitutional elements of the system device 51 and the keyboard device 52, and a memory device 65.

The memory device 65 includes a program storage area 66 and a data storage area 67. The program storage area 66 stores a keyboard initializing program 66a for recognizing the keyboard ID and transferring the recognized keyboard ID to the system device 51, and a keyboard output program 66b for converting a key switch position input through the keyboard 62 into a logical key number and transferring the logical key number to the system device 51 via the input/ output device 64. In addition, the data storage area 67 has a keyboard ID storage area 67a storing the keyboard ID recognized by the keyboard initializing program 66a, and a key-switch-number to logical-key-number conversion table t (hereinafter referred to as the "conversion table t").

The keyboard 62 has a keyboard matrix 68 including an ID storage section 68a and a matrix section 68b with respect to necessary pieces of keys, for example, p pieces of keys. The ID storage section 68a is formed by an IC including ROM, etc., and stores an ID code unique to the keyboard. The matrix section 68b outputs a signal corresponding to the key switch position of a key depressed.

For example, as shown in FIG. 20 which is related to Embodiment 2 to be described later, the matrix 68b is formed by 10 key scanning lines C0 to C9, and 8 key return lines R0 to R7. A key switch is formed at each of the intersections of the key scanning lines and the key return lines. The key switches are provided with key switch numbers Gp (p=00 to 74). Namely, a corresponding key switch number Gp is individually determined by each key scanning line and key return line.

The conversion table t shows the relationship between the key switch numbers Gp determined by the key scanning line numbers and key return line numbers, and the logical key numbers Kg (q=00–74). The relationship is the same as the relationship shown in FIG. 21 which is related to an embodiment of the present invention, to be described later.

The conversion tables T show the relationship between the logical key numbers Kq and character codes. As described above, the conversion table T varies according to the keyboard ID value. For example, a keyboard whose keyboard ID is 00 has an arrangement of keys which is the same as the arrangement of keys (FIG. 11) corresponding to the conversion table T00 shown in FIG. 4 related to an embodiment of the present invention, to be described later. When the keyboard ID has a different value, the conversion table T also varies.

In the information processing apparatus having the above-mentioned structure, when power is supplied to the system device 51 and the keyboard device 52 after connecting the keyboard 62 whose keyboard ID is 00 to the keyboard controller 61, the system initializing program 59a is activated. Then, when it is judged based on the value of the flag L that the system information is invalid, the system information memory device 55 transmits to the keyboard controller 61 a request for keyboard ID.

Upon the request for keyboard ID, the keyboard controller 61 activates the keyboard initializing program 66a. Then, the keyboard ID having a value of 00 is read from the ID storage section 68a of the keyboard 62, stored in the keyboard ID storage area 67a, and sent to the system device 51.

The system device 51 stores the keyboard ID in the keyboard ID storage area 55b, reads the conversion table T00 corresponding to the keyboard ID from the secondary memory 57, and stores the conversion table T00 in the logical-key-number to character-code conversion tables storage area 60b. As a result, the flag L is made valid, and the activation of the system is completed.

After making the above-mentioned setup, in the keyboard device 52, when a character is input through the keyboard 62, the keyboard output program detects the key switch number Gp of a depressed key, calls a logical key number Kq corresponding to the key switch number Gp from the conversion table t, and transmits the logical key number Kq to the system device 51.

In the system device 51, the keyboard input program 59b calls a character code corresponding to the input logical key number Kg from the conversion table T00, and outputs the character code to the display device 54.

As described above, the keyboard 62 includes the keyboard ID storage section 68a storing the unique keyboard ID, and the system device 51 has a plurality of conversion tables T corresponding to different keyboard ID values. By storing the conversion table T corresponding to the keyboard ID of the connected keyboard 62 in the logical-key-number to character-code conversion tables storage area 60b upon the activation of the information processing apparatus and by using the conversion table T, it is possible to output a character corresponding to a key depressed on the keyboard 62. Namely, this structure allows a single keyboard controller 61 to be compatible with a plurality of keyboards having different key arrangements.

However, in the above-mentioned conventional techniques, the system automatically identifies a keyboard upon the activation of the information processing apparatus. Thus, it is necessary to provide the keyboard with a new memory area (ID storage section 68a). For instance, when a system as a whole supports four types of keyboards, at least a two-bit memory area is required. Moreover, since an IC is added, a capacitor and a resister may be required to deal with unwanted radiation and electrostatic breakdown. As a result, the cost of the keyboard device 52 itself increases.

SUMMARY OF THE INVENTION

It is an object of the present invention to provide an information processing apparatus capable of using more than one type of keyboard with a single keyboard controller without increasing the production cost.

In order to achieve the above object, the present invention takes the following means with respect to an information processing apparatus including a keyboard device having a keyboard as input means and a keyboard controller for outputting logical key numbers corresponding to key switch positions on the keyboard, and a system device for outputting character codes corresponding to the logical key numbers. Namely, in order to achieve the above object, an information processing apparatus of the present invention enables keyboards having different key arrangements to be connected to the keyboard device, and a specific key which is common to the keyboards having different key arrangements is arranged so that the key scanning line corresponding to the specific key is connected to a key return line at a key switch position on the keyboard matrix, which varies according to each keyboard. Moreover, the type of a keyboard is identified by depressing the specific key and detecting which key return line is connected to the key scanning line corresponding to the specific key.

With this structure, since the combination of the key scanning line and the key return line which are connected to each other when the specific key is depressed varies according to each keyboard, different signals are obtained from the respective keyboards. Consequently, it is possible to distinguish the keyboards based on the signals. It is therefore unnecessary for the keyboard to have structure for identifying the keyboard, for example, for outputting the keyboard ID. Namely, it is possible to provide an information processing apparatus capable of using more than one type of keyboard with a single keyboard controller without increasing the production cost.

Moreover, in order to output the logical key numbers, the keyboard controller includes a first memory for storing a key-switch-number to logical-key-number conversion table. The first memory stores a plurality of key-switch-number to logical-key-number conversion tables corresponding to the keyboards having different key arrangement. The information processing apparatus of the present invention effects outputting of logical key numbers corresponding to key switch positions based on a key-switch-number to logicalkey-number conversion table which is selected according to a signal obtained by depressing the specific key.

With this structure, a key-switch-number to logical-key-number conversion table corresponding to a detected keyboard type is used in the keyboard controller. Consequently, the keys depressed are correctly converted into corresponding character codes according to a connected keyboard. It is therefore possible to make a single keyboard controller compatible with a plurality of keyboards. In the keyboard controller, in order to identify the keyboard, for example, a program that depresses the specific key when the information processing apparatus is activated is operated.

Furthermore, the information processing apparatus of the present invention effects outputting of character codes corresponding to logical key numbers based on a logical-key-number to character-code conversion table which is selected according to the type of keyboard.

With this structure, the transmission of signals between the keyboard device and the system device is standardized by the logical key numbers. Therefore, even if the keyboard device has not only a different key arrangement but also a different physical arrangement of the keyboard matrix, the keyboard device can be connected to the system device by converting signals through the key-switch-number to logical-key-number conversion table and the logical-key-number to character-code conversion table.

In addition, in the information processing apparatus of the present invention, the key scanning line can be connected to any one of the key return lines on the keyboard matrix through only a key switch position corresponding to the specific key.

With this structure, it is possible to locate the key switch corresponding to the specific key on different key switch positions according to the number of key return lines by only providing an additional key scanning line exclusively for the specific key. Namely, it is possible to distinguish the same number of keyboard ID values as the number of key return lines.

Furthermore, in the information processing apparatus of the present invention, the key switch position corresponding to the specific key can be changed, and the key-switch-number to logical-key-number conversion tables are arranged so that the relationship between the logical key numbers of the respective conversion tables and the specific key becomes uniform.

With this arrangement, by varying the key switch position corresponding to the specific key according to each keyboard, the same character code is obtained when the specific key is depressed, but the key switch position obtained by the depression of the specific key varies according to the types of keyboards. It is thus possible to distinguish a keyboard ID.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a block diagram showing the system structure of a personal computer of the present invention.

FIG. 3(*b*) is a partial circuit diagram of a modified example of the keyboard matrix circuit shown in FIG. 1, which is used in a keyboard whose keyboard ID is 02.

FIG. 4 is a logical-key-number to character-code conversion table T00 corresponding to a keyboard ID having a value 00.

FIG. 5 is a logical-key-number to character-code conversion table T01 corresponding to a keyboard ID having a value 01.

FIG. 6 is a logical-key-number to character-code conversion table T02 corresponding to a keyboard ID having a value 02.

FIG. 7 is a key-switch-number to logical-key-number conversion table t00 corresponding to a keyboard ID having a value 00.

FIG. 8 is a key-switch-number to logical-key-number conversion table t01 corresponding to a keyboard ID having a value 01.

FIG. 9 is a key-switch-number to logical-key-number conversion table t02 corresponding to a keyboard ID having a value 02.

FIG. 21 is a key-switch-number to logical-key-number conversion table t00' corresponding to a keyboard ID having a value 00 according to the embodiment of FIG. 20.

FIG. 22 is a key-switch-number to logical-key-number conversion table t01' corresponding to a keyboard ID having a value 01 according to the embodiment of FIG. 20.

FIG. 23 is a key-switch-number to logical-key-number conversion table t02' corresponding to a keyboard ID having a value 02 according to the embodiment of FIG. 20.

DESCRIPTION OF THE PREFERRED EMBODIMENTS

[Embodiment 1]

Figure 1:
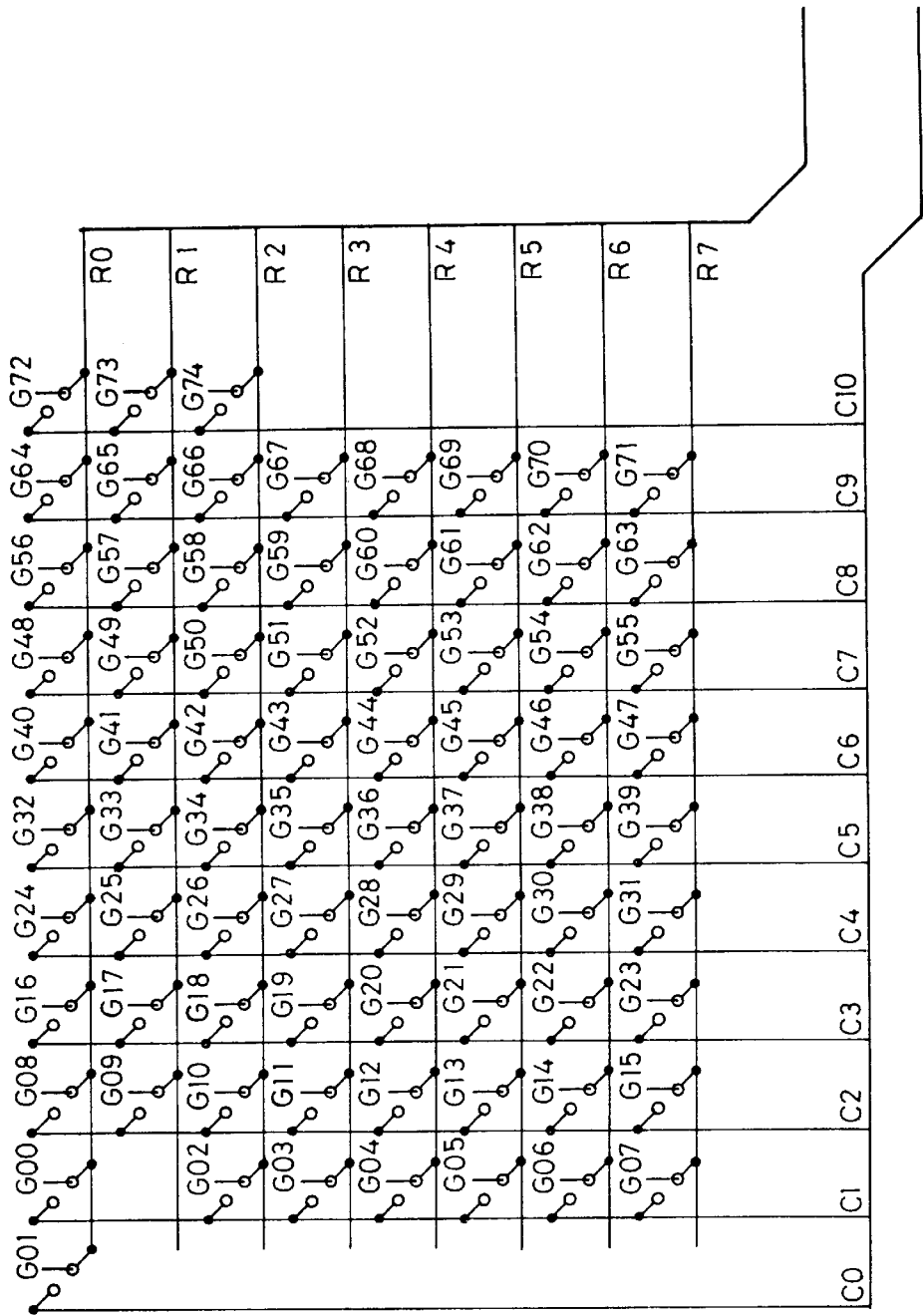
FIG. 1 is a circuit diagram showing a keyboard matrix circuit used in a keyboard whose keyboard ID is 00 according to one embodiment of the present invention.
Figure 3:
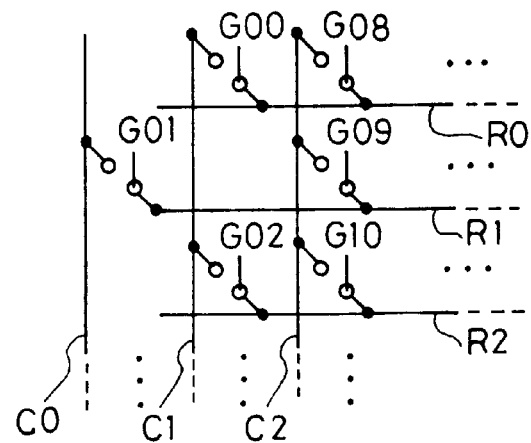
FIG. 3(*a*) is a partial circuit diagram of a modified example of the keyboard matrix circuit shown in FIG. 1, which is used in a keyboard whose keyboard ID is 01.
Figure 3:
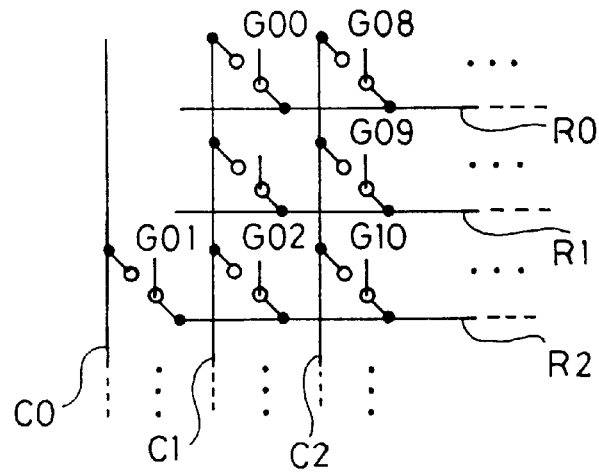

The following description will explain one embodiment of the present invention with reference to FIGS. 1 to 19.

FIG. 2 is a block diagram showing the system structure of a personal computer of the present invention. The personal computer includes a system device 1, and a keyboard device 2. The system device 1 includes a central processing unit 11, a display device 12, a system information memory device 13 formed by an EEPROM, FLASHROM, non-volatile RAM, or the like, a main memory 14 formed by a read/write RAM, a secondary memory 15 formed by HDD, etc., and an input/output device 16 for managing the flow of signals between the constitutional elements of the keyboard device 2 and the system device 1.

The system information memory device 13 includes a system information valid flag storage area 13a storing a system information valid flag (hereinafter just referred to as the flag) L for determining whether initialization of the keyboard as input means is to be performed or not, and a keyboard ID storage area 13b storing a recognized keyboard ID from the keyboard device 2. The flag L is arranged to be 1 (L=1) after the completion of the execution of a keyboard initializing program 26a which is called from a system initializing program 17a, to be described later, when the power supply of the system is first switched on. More specifically, the system device 1 judges that the system information is invalid when L=0, and that the system information is valid when L=1. When L=1, the system device 1 performs the following operations. The keyboard ID is a unique number allotted to each keyboard device 2 and the number varies according to the types of keyboards so that the system device 1 can identify the types of keyboards.

The main memory 14 includes a program storage area 17 storing the system initializing program 17a for initializing the system setup and a keyboard input program 17b for converting a logical key number input to the keyboard device 2 into a character code, and a data storage area 18 formed by a character codes storage area 18a and a conversion tables storage area 18b storing logical-key-number to character-code conversion tables.

The secondary memory 15 stores three logical-key-number to character-code conversion tables T00 to T02 (hereinafter referred to as the "conversion tables T00 to T02", the conversion tables T00 to T02 may be generically called the "tables T") corresponding to different keyboard ID values. In this embodiment, since compatible keyboards are of three types, three conversion tables T00 to T02 are stored. However, the number of conversion tables T to be stored in the secondary memory 15 in advance can be determined according to need. Namely, the number of the conversion tables T is not necessarily limited to three.

As illustrated in FIG. 2, the keyboard device 2 is formed by a keyboard controller 21 and a keyboard 22.

The keyboard controller 21 is formed by a central processing unit 23, an input/output device 24 for managing the flow of signals between the constitutional elements of the system device 1 and the keyboard device 2, and a memory device 25.

The memory device 25 includes a program storage area 26 and a data storage area 27. The program storage area 26 stores a keyboard initializing program 26a for recognizing the keyboard ID and transferring the recognized keyboard ID to the system device 1, and a keyboard output program 26b for converting a key switch position input through the keyboard 22 into a logical key number and transferring the logical key number to the system device 1 via the input/output device 24. In addition, the data storage area 27 stores a keyboard ID storage area 27a storing the keyboard ID recognized by the keyboard initializing program 26a, and three key-switch-number to logical-key-number conversion tables t00 to t02 (hereinafter referred to as the "conversion tables t00 to t02", the conversion tables t00 to t02 may be generically called the "conversion tables t"). Similarly to the conversion tables T, the number of conversion tables t can be determined according to need.

The keyboard 22 includes a keyboard matrix 22a having a structure for allowing the system device 1 to recognize the keyboard ID, and key switches Gp (p=00 to 74) corresponding to the respective keys.

As illustrated in FIG. 1, the keyboard matrix 22a is formed by key scanning lines Ci (i represents a key scanning line number), and key return lines Rj (j is a key return line number). The key switch Gp is formed at each of the intersections of the key scanning lines Ci and the key return lines Rj. A key switch Gp is selected by depressing a key. In this case, at a key switch position CiRj of a key switch Gp, since the result of scanning a key scanning line Ci is returned to a key return line Rj connected with the key switch Gp, it is possible to detect which key switch Gp is selected.

In the keyboard device 2, the key switch position represented by the key scanning line Ci and the key return line Rj of the detected key switch number Gp is converted into a logical key number Kq by the conversion tables t, and then transferred to the system device 1. In the system device 1, the logical key number Kq transferred from the keyboard device 2 is converted into a character code by the conversion tables T.

In this embodiment, as described above, the system device 1 corresponds to keyboards having keyboard ID values 00, 01, and 02. For example, FIG. 1 shows a circuit diagram of a keyboard matrix circuit corresponding to the keyboard ID value 00 with a key scanning line number i (i=0 to 10) and a key return line number j (j=0 to 7). In each of the keyboard matrix circuits corresponding to keyboard ID values 01 and 02, as shown in FIGS. 3(a) and 3(b), the position of a key return line Rj corresponding to the key switch number G01 differs from that in the keyboard matrix circuit corresponding to the keyboard ID value 00.

The secondary memory 15 stores the conversion table T00 (FIG. 4) corresponding to a keyboard ID value 00, the conversion table T01 (FIG. 5) corresponding to a keyboard ID value 01, and the conversion table T02 (FIG. 6) corresponding to a keyboard ID value 02. The data storage area 27 stores the conversion table t00 (FIG. 7) corresponding to the keyboard ID value 00, the conversion table t01 (FIG. 8) corresponding to the keyboard ID value 01, and the conversion table t02 (FIG. 9) corresponding to the keyboard ID value 02.

Moreover, in the conversion tables t, a logical key number K01 is allotted to the key switch number G01. An [F1] key (specific key) is set as a key for requesting a user to make an input to identify the type of the keyboard during the initialization of the system, and is allotted to the logical key number K01 in the conversion tables T. Thus, the characters "F1" are printed on the top of a key corresponding to the key switch number G01.

Therefore, when the "F1" key is depressed, the key switch number G01 is selected, and the characters "F1" as a character code are input. In this case, if the keyboard ID is 00, the position of a key return line from which a signal is returned when scanning C0 is R0. If the keyboard ID is 01, the position of the key return line is R1. If the keyboard ID is 02, the position of the key return line is R2. It is thus possible to distinguish keyboards.

Figure 10:
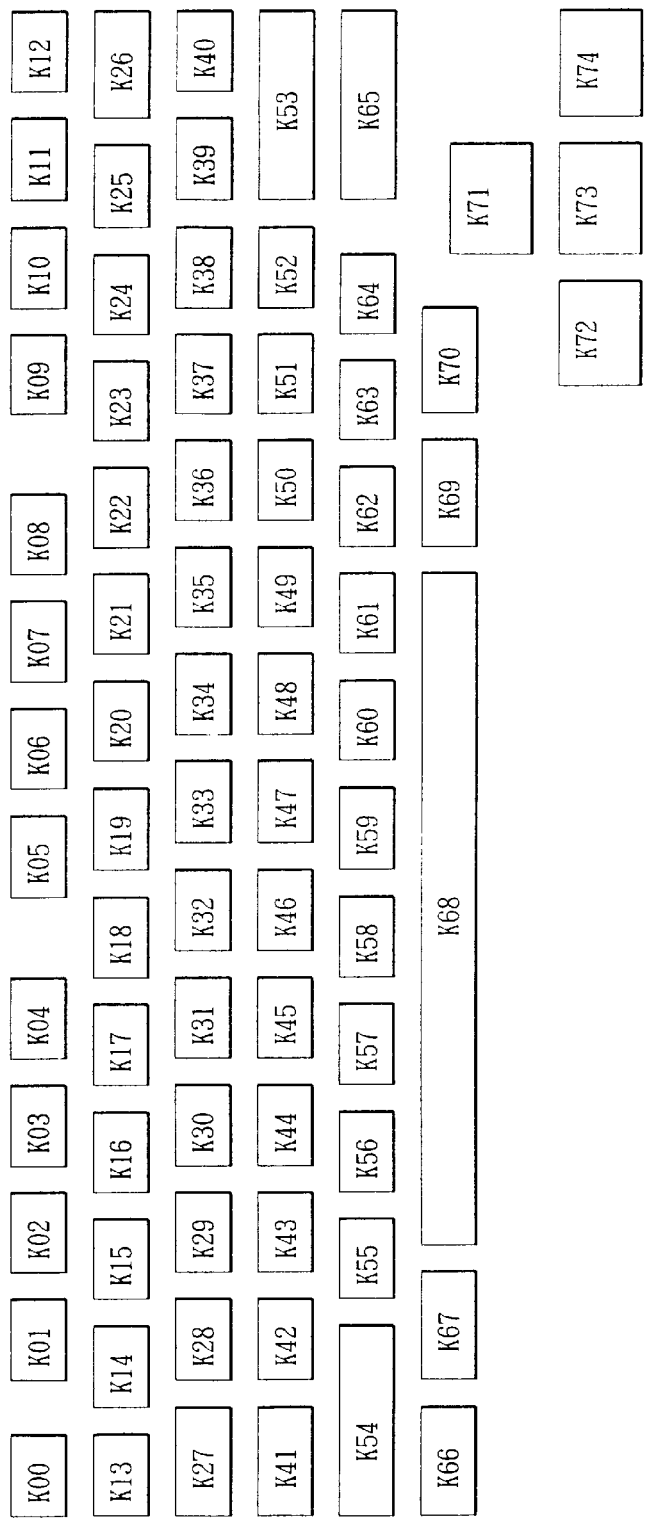
FIG. 10 is an explanatory view showing the relationship between the key arrangement on a keyboard and logical key numbers.
Figure 11:
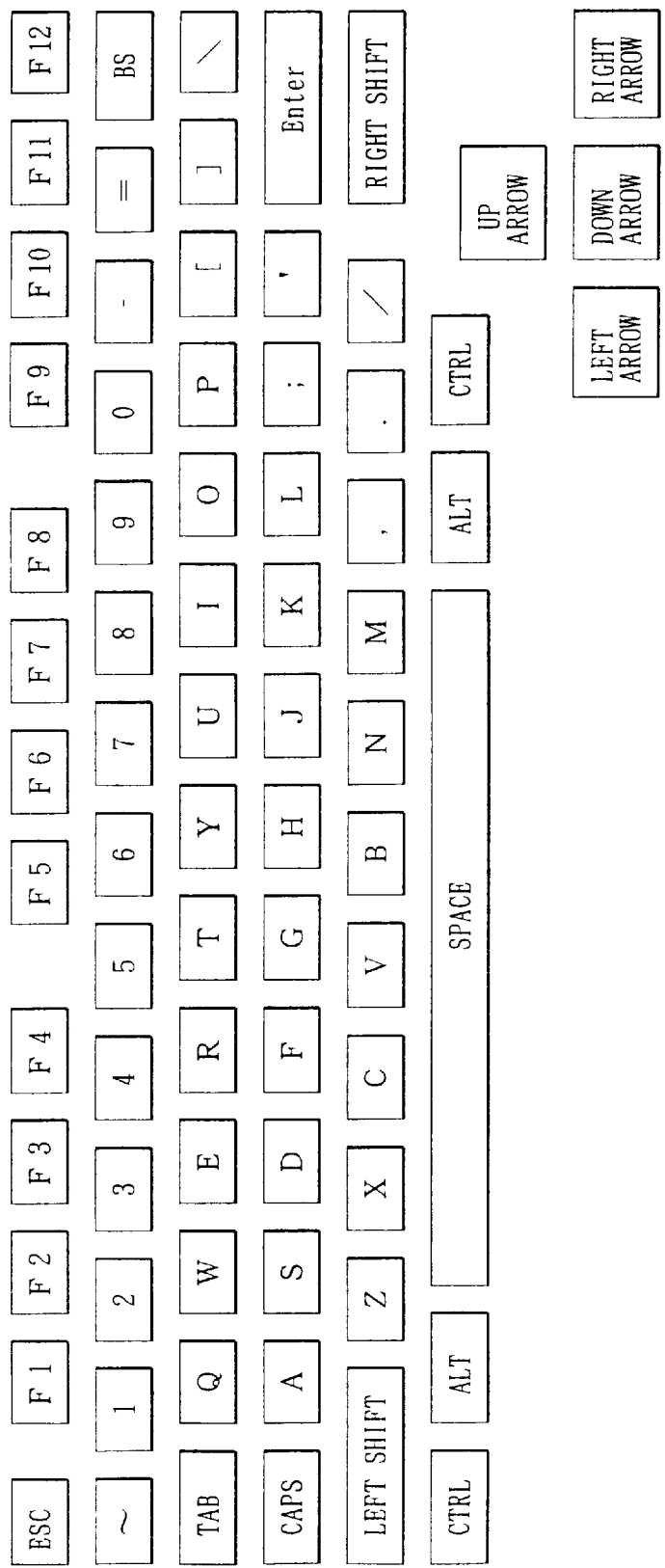
FIG. 11 is an explanatory view showing the relationship between the characters shown on the top of keys and the key arrangement when the keyboard ID is 00.
Figure 12:
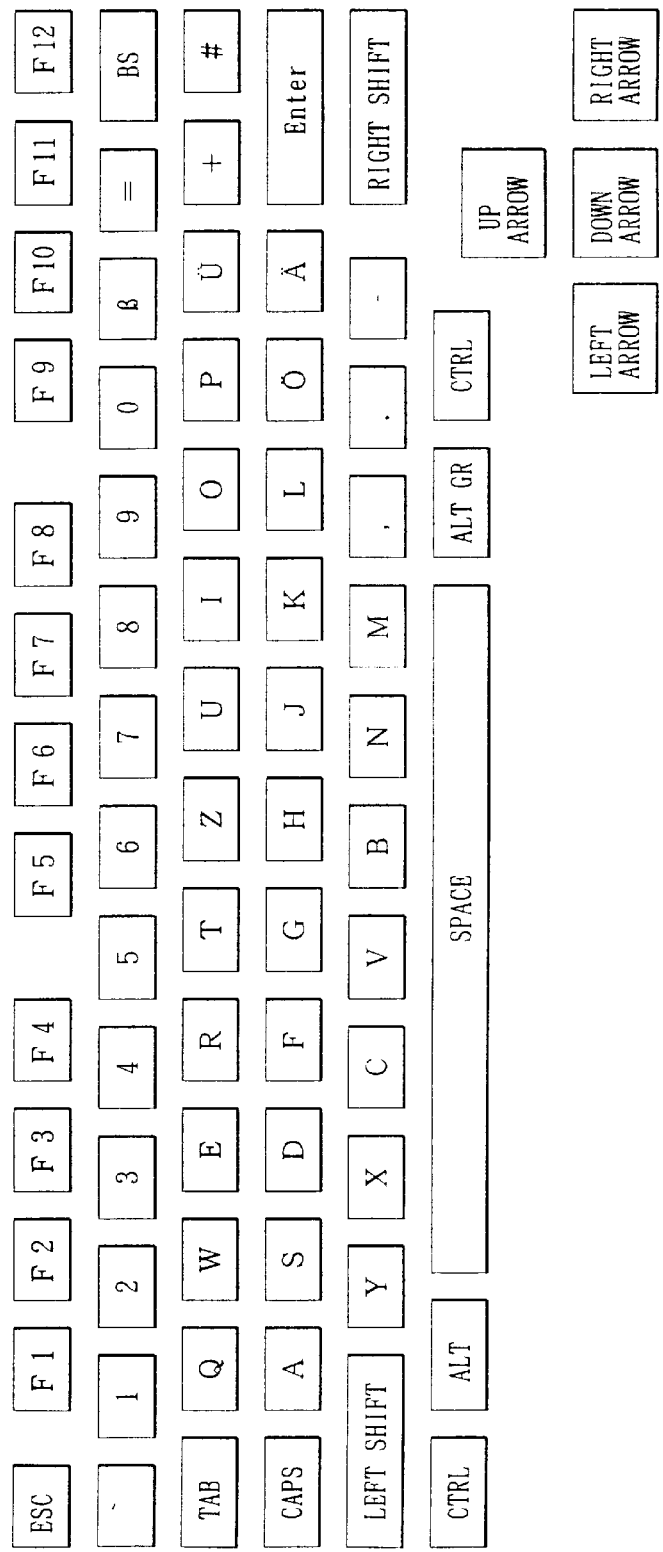
FIG. 12 is an explanatory view showing the relationship between the characters shown on the top of keys and the key arrangement when the keyboard ID is 01.
Figure 13:
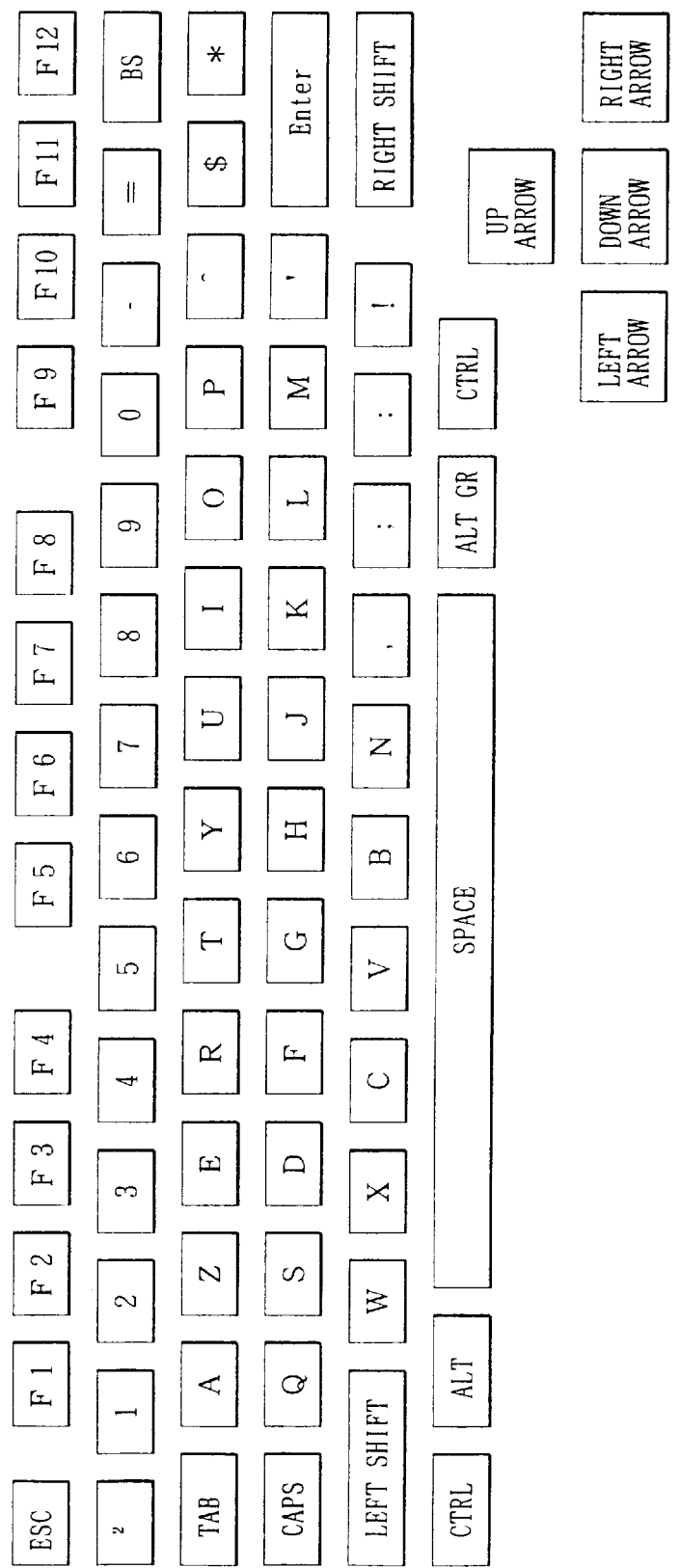
FIG. 13 is an explanatory view showing the relationship between the characters shown on the top of keys and the key arrangement when the keyboard ID is 02.

The physical positions of the keys on the keyboard depend on the logical key number Kq, and the arrangement of the keys is shown in FIG. 10. Hence, according to the conversion tables T00 to T02 shown in FIGS. 4 to 6, the key arrangements on the keyboards having keyboard ID values 00, 01 and 02 are shown in FIGS. 11, 12 and 13, respectively.

In the above-mentioned structure, the operation of detecting a keyboard upon the supply of power to the personal computer of this embodiment will be explained below with reference to FIGS. 14 to 19.

When power is supplied to the system device 1 and the keyboard device 2, the system initializing program 17a stored in the main memory 14 is activated.

Figure 14:
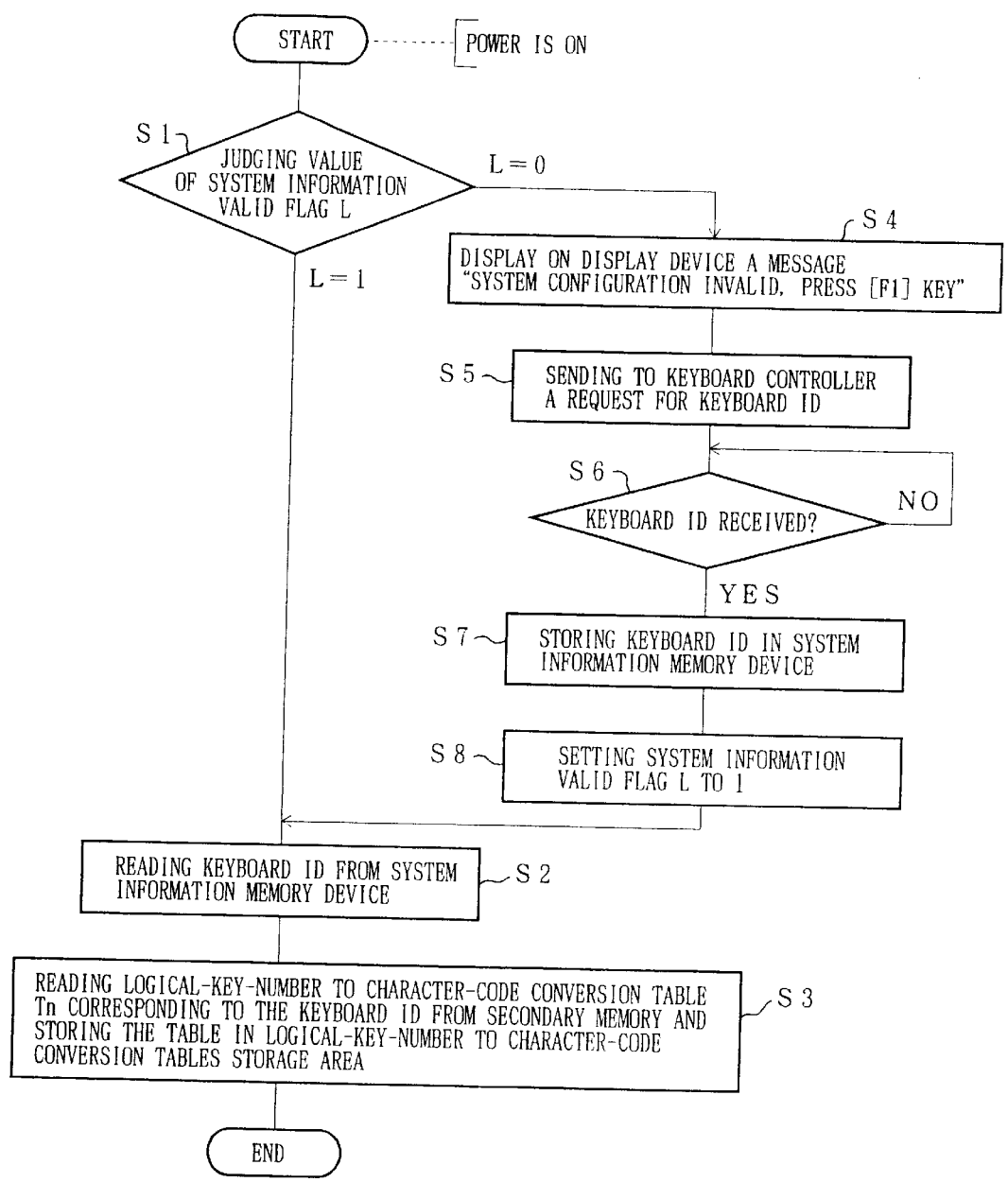
FIG. 14 is a flow chart of a system initializing program.

When the system initializing program 17a is activated, as shown in FIG. 14, the value of the flag L stored in the system information valid flag storage area 13a is first judged (step S1).

In S1, if L=1, i.e., the system information is judged to be valid, the keyboard ID is read from the keyboard ID storage area 13b (step S2). Subsequently, a conversion table Tn corresponding to the value of the read keyboard ID is read from the secondary memory 15, and stored in the conversion tables storage area 18b (step S3). Then, the system initializing program 17a is completed.

On the other hand, if L=0, i.e., the system information is judged to be in-valid, a message "SYSTEM CONFIGURATION INVALID, PRESS [F1] KEY" is displayed (step S4) in order to inform the user that the system information is in-valid. Then, when the [F1] key is depressed, a request for keyboard ID is transmitted to the keyboard controller 21 via the input/output device 16 (step S5). At this time, the system initializing program 17a waits until the keyboard ID is sent from the keyboard controller 21 (step S6).

When the keyboard ID is sent, the keyboard ID is stored in the keyboard ID storage area 13b (step S7). Thereafter, the flag L representing 1 is stored in the system information valid flag storage area 13a (step S8), and then the procedure moves to S2. The procedure after S2 is performed in the manner mentioned above.

Meanwhile, in the keyboard controller 21, the keyboard initializing program 26a is activated upon the receipt of the request for keyboard ID sent from the system device 1 in S5.

Figure 15:
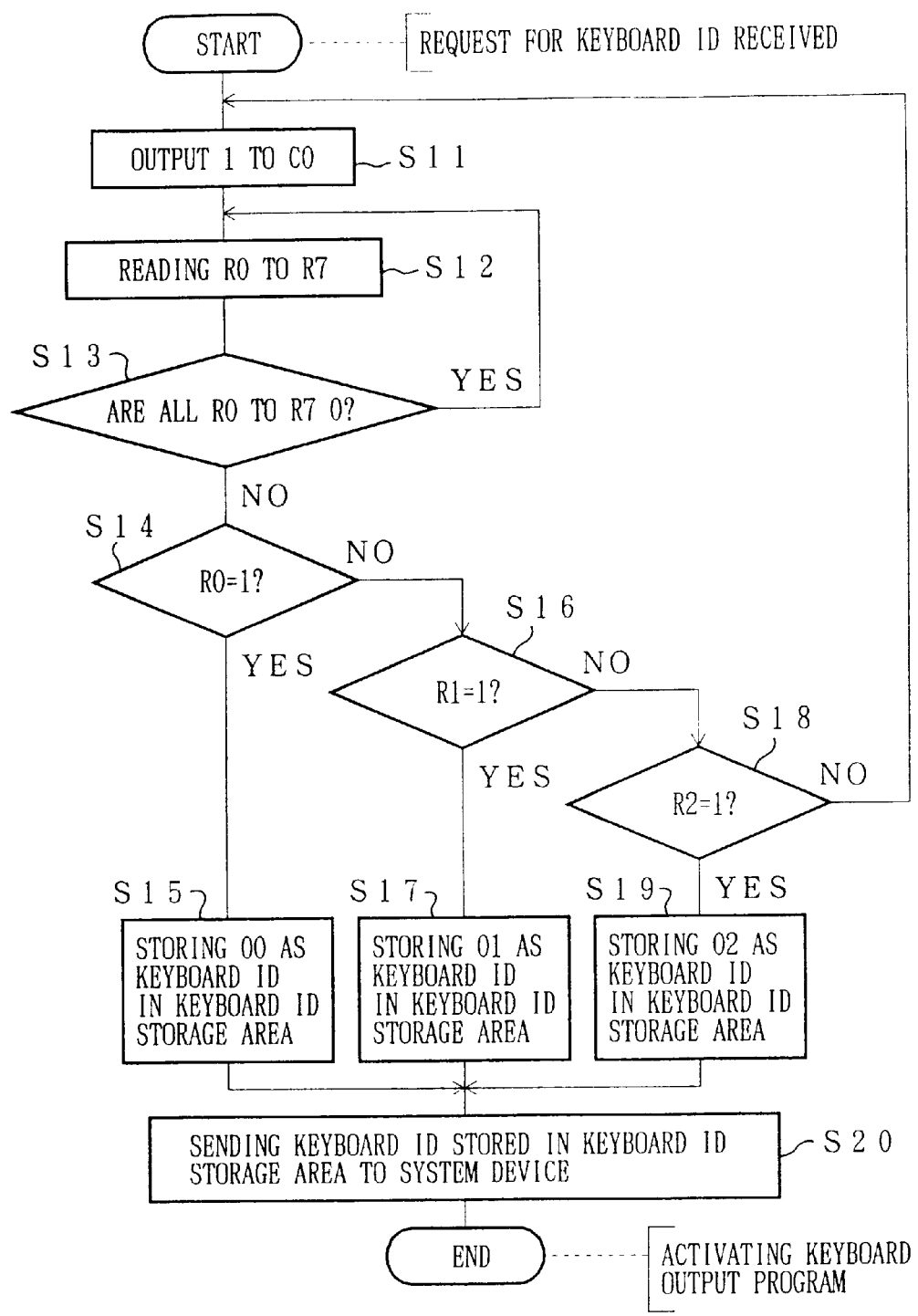
FIG. 15 is a flow chart of a keyboard initializing program.

When the keyboard initializing program 26a is activated, as shown in FIG. 15, the keyboard controller 21 first outputs 1 to the key scanning line C0 of the keyboard matrix 22a (step S11), and reads the values of the key return lines R0 to R7 (step S12). Then, it is judged whether all of R0 to R7 are 0. If all of R0 to R7 are 0, the control procedure returns to S12 (step S13).

In S13, if at least any one of the eight key return lines R0 to R7 is 1, the value of the key return line R0 is first judged (step S14). If R0=1, 00 is stored as the keyboard ID in the keyboard ID storage area 27a (step S15). If R0≠1, the value of the key return line R1 is judged (step S16). If R1=1, 01 is stored as the keyboard ID in the keyboard ID storage area 27a (step S17). If R1≠1, the value of the key return line R2 is judged (step S18). If R2=1, 02 is stored as the keyboard ID in the keyboard ID storage area 27a (step S19). Furthermore, if R2≠1, it is judged that the recognition of the input key switch failed, and the control procedure returns to S11. Since the above-mentioned keyboard initializing program 26a corresponds to three types of keyboards, when R0 to R2 are 0, the procedure returns to S11. However, the keyboard initializing program 26a detects the keyboard based on the value of the key return line Rj. Therefore, in the above-mentioned case, the keyboard controller is physically compatible with a maximum of eight types of keyboards.

Next, the keyboard ID stored in the keyboard ID storage area 27a is transmitted to the system device 1 (step S20) to complete the keyboard initializing program 26a. Thereafter, the keyboard output program 26b is activated.

Figure 16:
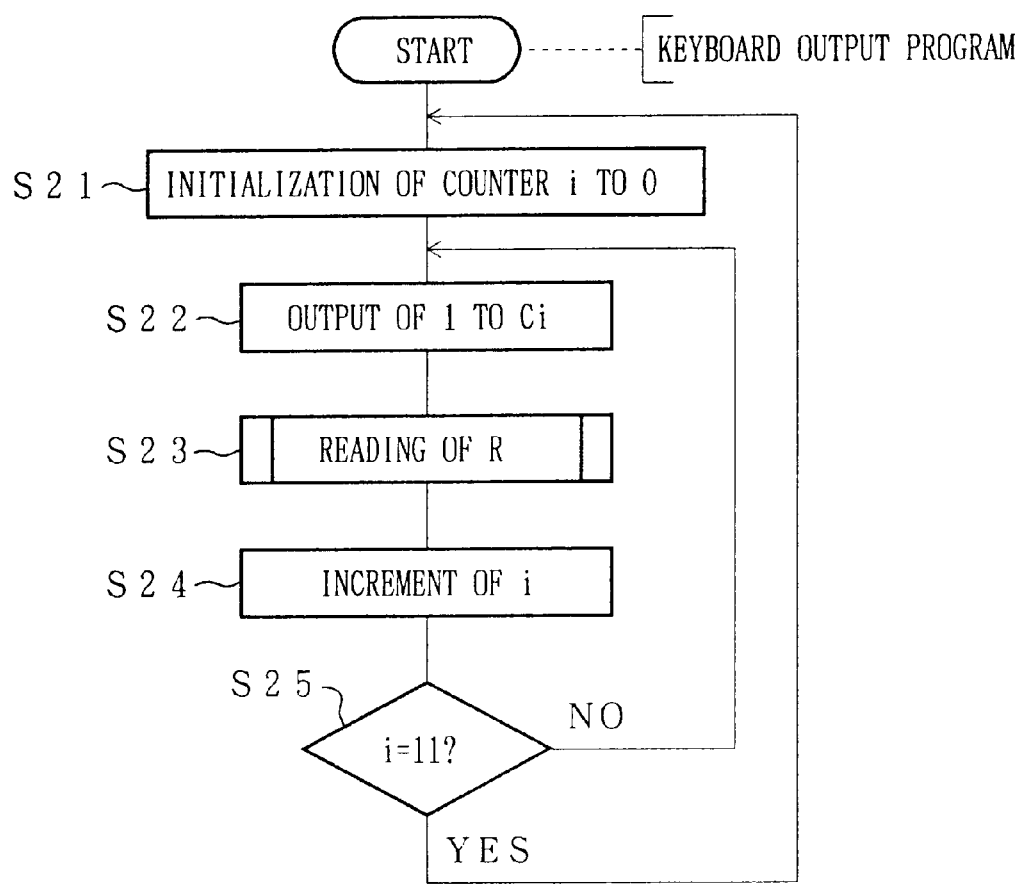
FIG. 16 is a flow chart of a keyboard output program.

When the keyboard output program 26b is activated, as shown in FIG. 16, a counter i is first initialized to show 0 (step S21), and 1 is output to the key scanning line Ci of the keyboard matrix 22a (step S22). Subsequently, the key return line Rj is read (step S23), and an increment of i is performed (step S24). In this embodiment, since the total number of the key scanning lines C0 to C10 is 11, a series of processing from S22 to S24 is repeated until i becomes 11 (step S25). When i becomes 11, the procedure returns to S21.

Figure 17:
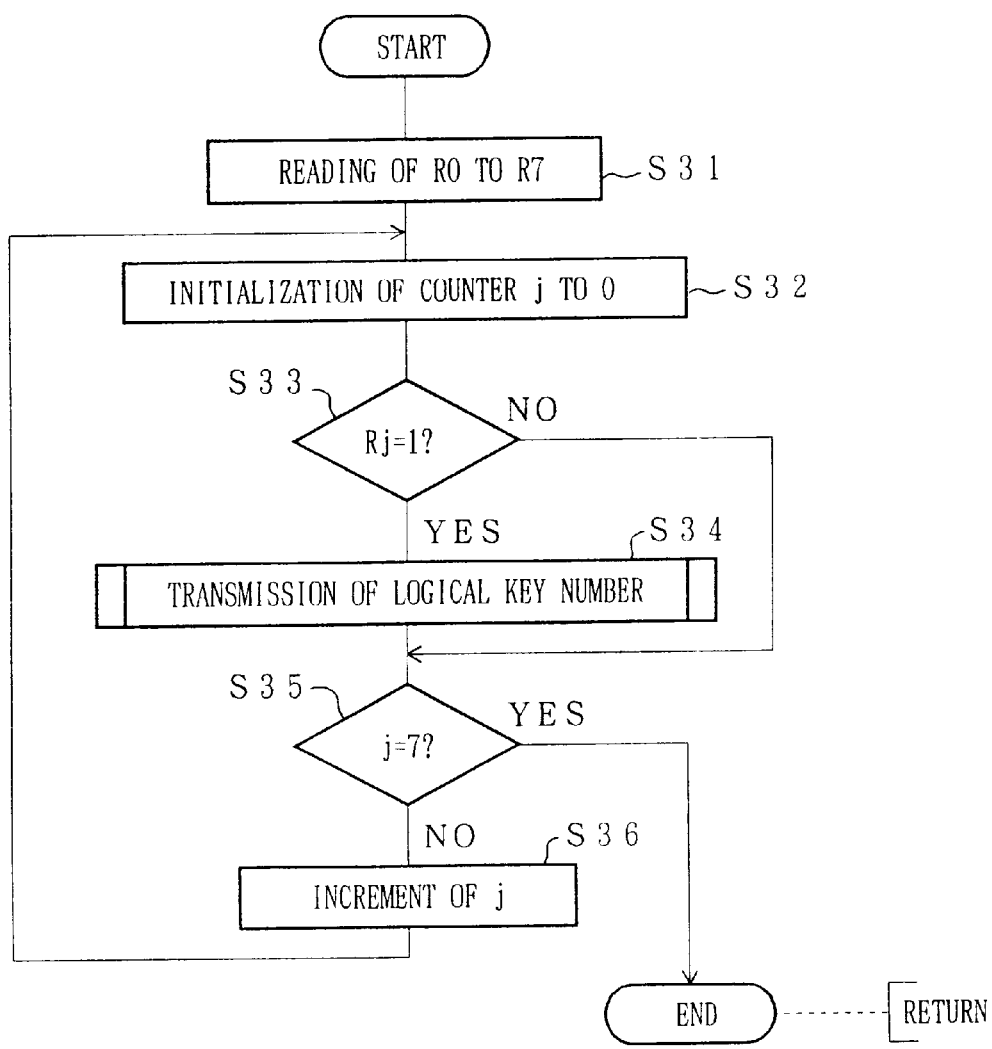
FIG. 17 is a flow chart of the R reading process in FIG. 16.

Referring now to FIG. 17, the following description will explain the operation of reading R in S23.

When reading R, first, the key return lines R0 to R7 are all read (step S31), and then a counter j is initialized to 0 (step S32). Thereafter, it is judged whether the key return line Rj of the keyboard matrix 22a is 1 or not (step S33). If Rj=1, the transmission of the logical key number is performed (step S34), and then the procedure moves to S35. If Rj≠1, the procedure moves to S35 without performing the operation in S34. Subsequently, it is judged whether j is 7 or not (S35). If j≠7, an increment of j is performed (S36), and the procedure moves to S32. On the other hand, if j=7, reading of R is completed, and the procedure returns to a point where the reading of R was called.

More specifically, when scanning each key scanning line, by checking all the key return lines which can be connected to the key scanning line by the key switches so as to detect a return of a signal, the position of a key switch which is being depressed is detected.

Figure 18:
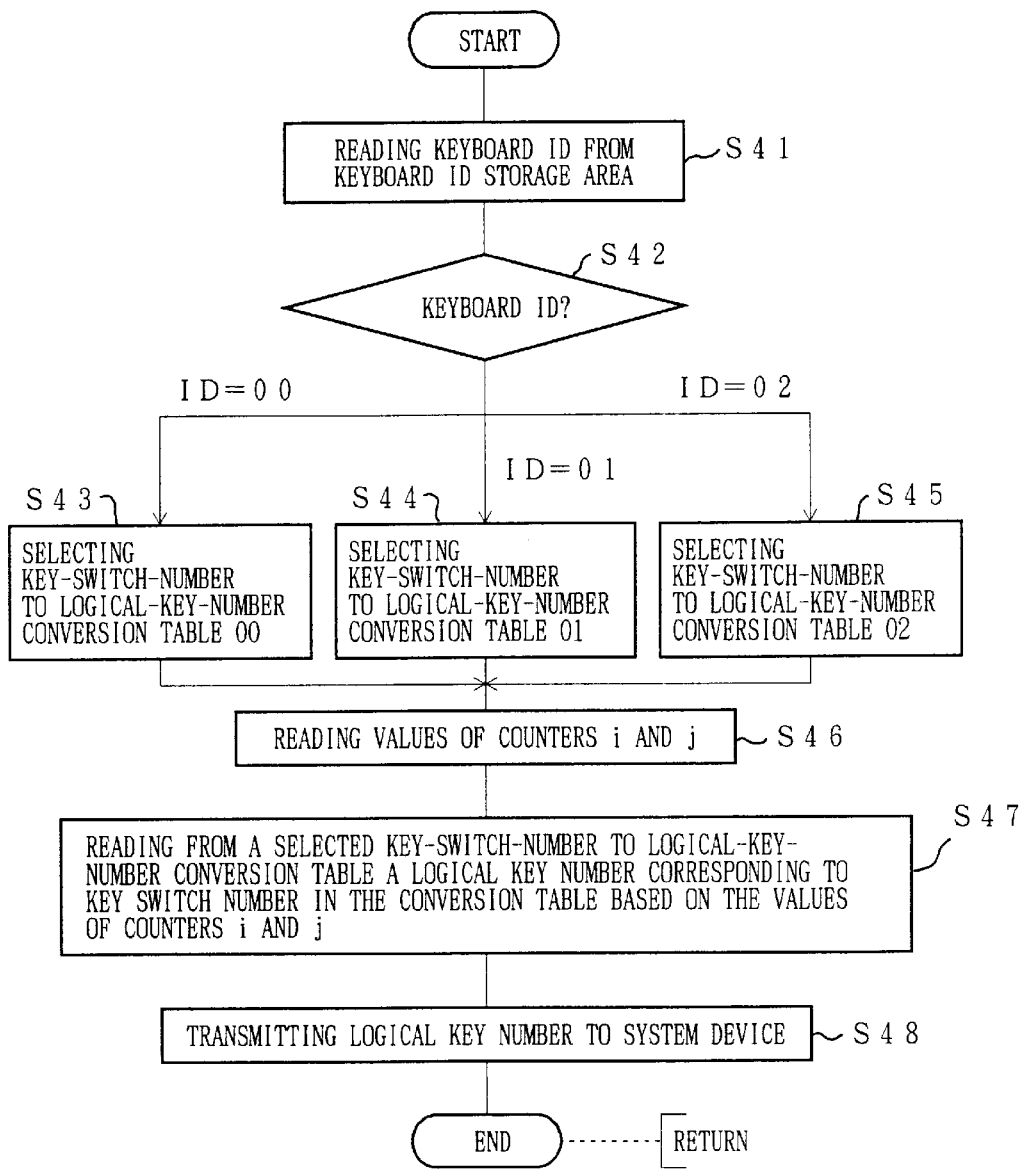
FIG. 18 is a flow chart of the logical key number transmission process in FIG. 17.

The operation of the transmission of the logical key number in S34 will be explained with reference to FIG. 18.

In the transmission of the logical key number, first, the keyboard ID is read from the keyboard ID storage area 27a (step S41). The transmitting operation is separated into S43 to S45 depending on the keyboard ID values, i.e., the types of keyboards (step S42). In S42, if the keyboard ID value is 00, the leading address of the conversion table t00 is selected (step S43). When the keyboard ID value is 01, the leading address of the conversion table t01 is selected (step S44). When the keyboard ID value is 02, the leading address of the conversion table t02 is selected (step S45). Subsequently, the values of the counters i and j are read (step S46), and a logical key number Kq corresponding to the key switch position CiRj is read from a selected conversion table t based on the values of the counters i and j. The read logical key number Kq is transmitted to the system device 1 (step S48) to complete the transmission of the logical key number, and the procedure returns to a point where the transmission of the logical key number was called.

As described above, in a period during which the system device 1 and the keyboard device 2 are in an operative state, in the keyboard device 2, the keyboard output program 26b is always arranged to be in an infinite loop state. In this arrangement, the keyboard device 2 can transmit to the system device 1 a logical key number Kq corresponding to the detection of a key switch being depressed.

Meanwhile, in the system device 1, the central processing unit 11 is interrupted upon the transmission of the logical key number Kq from the keyboard controller 21. The keyboard input program 17b is a processing program for the interruption, and executed in the system 1. The keyboard input program 17b outputs a character code based on the logical key number Kq transmitted from the keyboard device 2.

Figure 19:
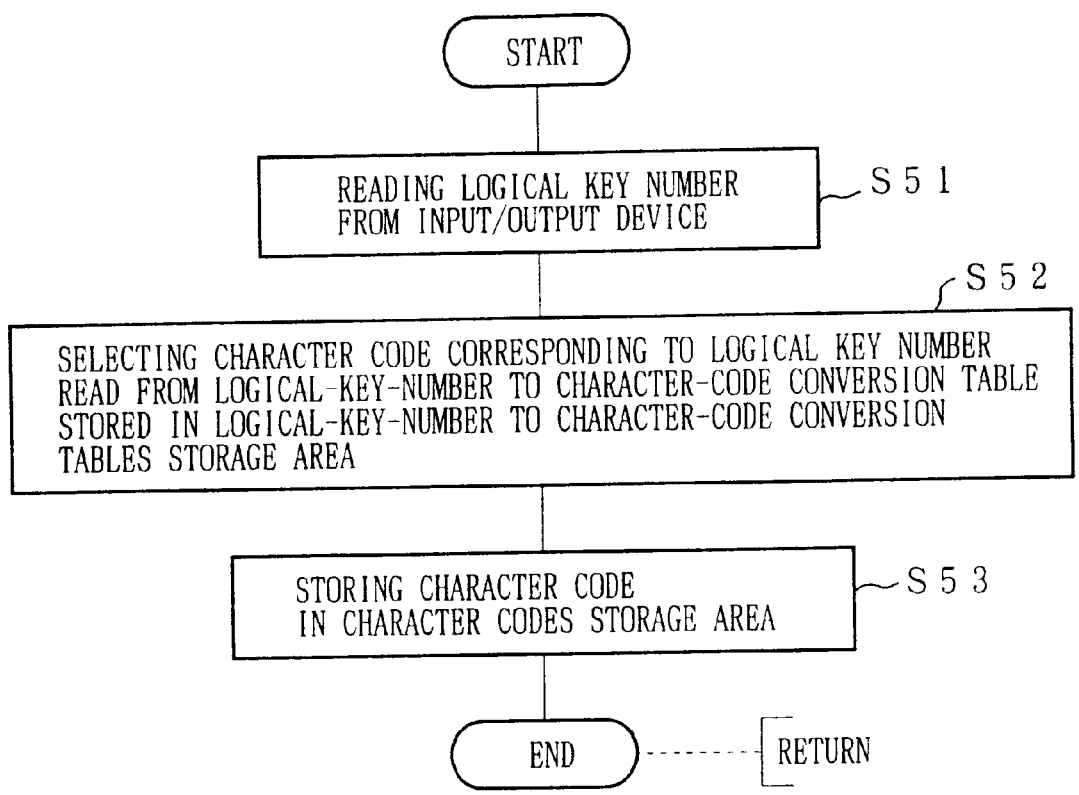
FIG. 19 is a flow chart of a keyboard input program.

Referring now to FIG. 19, the following description will explain the operation of the keyboard input program 17b.

First, when the keyboard input program 17b is activated, a logical key number Kq is read by the input/output device 16 (step S51), and a character code corresponding to the read logical key number Kq is selected from the conversion tables T stored in the conversion tables storage area 18b (step S52). The selected character code is stored in the character codes storage area 18a in the main memory 14 (step S53) to complete the keyboard input program 17b, and the procedure returns to a point where the keyboard input program 17b is called.

As described above, in the keyboard device, a key scanning line (equivalent to the key scanning line C0 in this embodiment) for identifying the types of keyboards is provided, and a specific key ([F1]=key switch number G01) which can be connected to different key return lines according to the types of keyboards is arranged. In the keyboard controller, a plurality of key-switch-number to logical-key-number conversion tables corresponding to different keyboard ID values are provided. By instructing the user to select the above-mentioned specific key when the system is activated, a signal is returned from a key return line which varies according to the types of keyboards. It is therefore possible to distinguish the keyboards. Namely, it is possible to distinguish the keyboard ID by simply expanding a part of the keyboard matrix without additionally providing a special memory area in the keyboard. This structure allows a single keyboard controller to be compatible with more than one type of keyboard at low costs. Consequently, it is possible to provide an information processing apparatus capable of using more than one type of keyboard with a single keyboard controller without increasing the production cost.

[Embodiment 2]

The following description will explain another embodiment of the present invention with reference to FIGS. 20 to 23. The structures having the same function as in the above-mentioned embodiment will be designated by the same reference number and their description will be omitted.

The system structure of a personal computer of this embodiment is substantially the same as the system structure of the personal computer of embodiment 1 shown in FIG. 2, and also supports three keyboards like embodiment 1. These keyboards are the same as those explained in Example 1 in respect of the positional relationship of the characters printed on the top of the keys.

Figure 20:
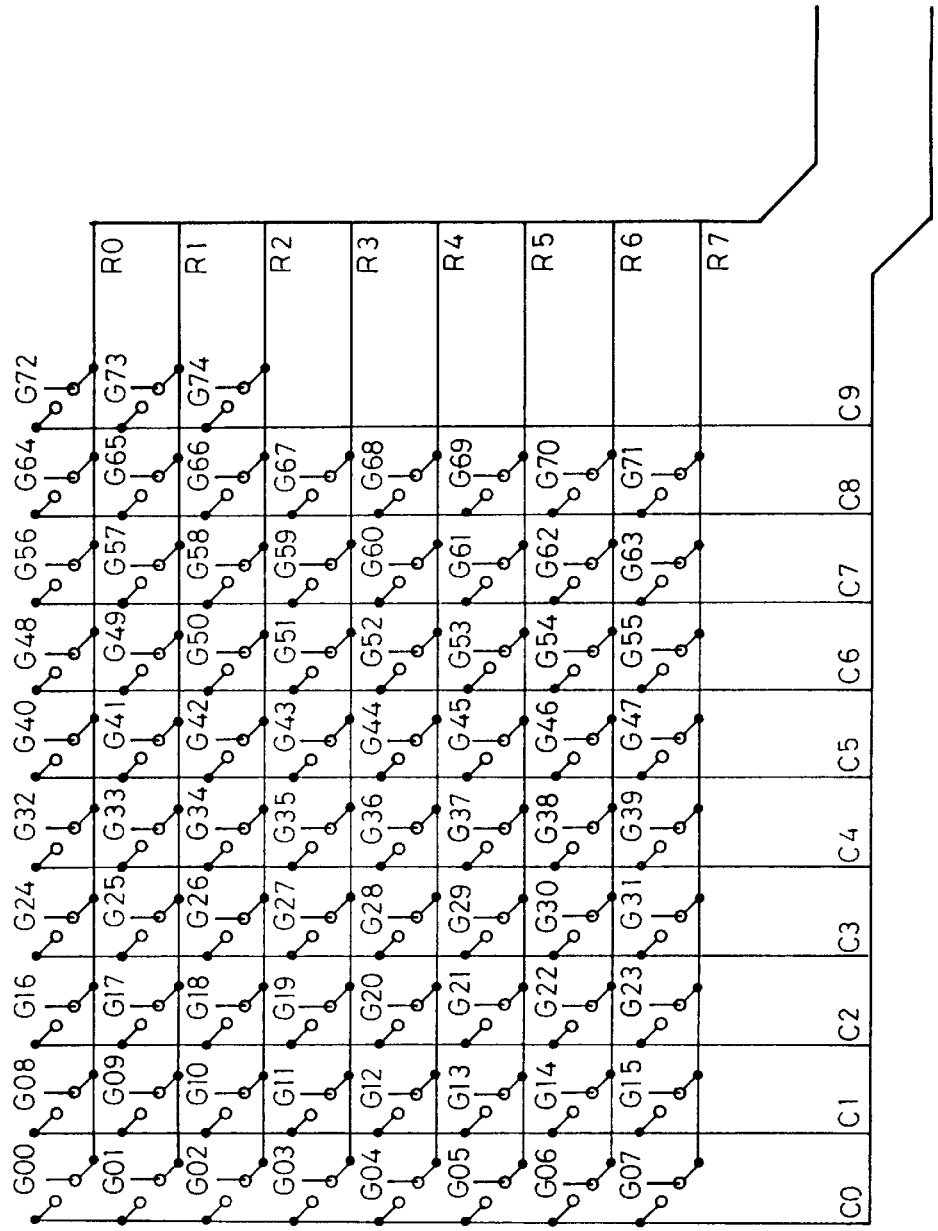
FIG. 20 is a circuit diagram showing a keyboard matrix circuit of a keyboard according to another embodiment of the present invention.
Figure 24:
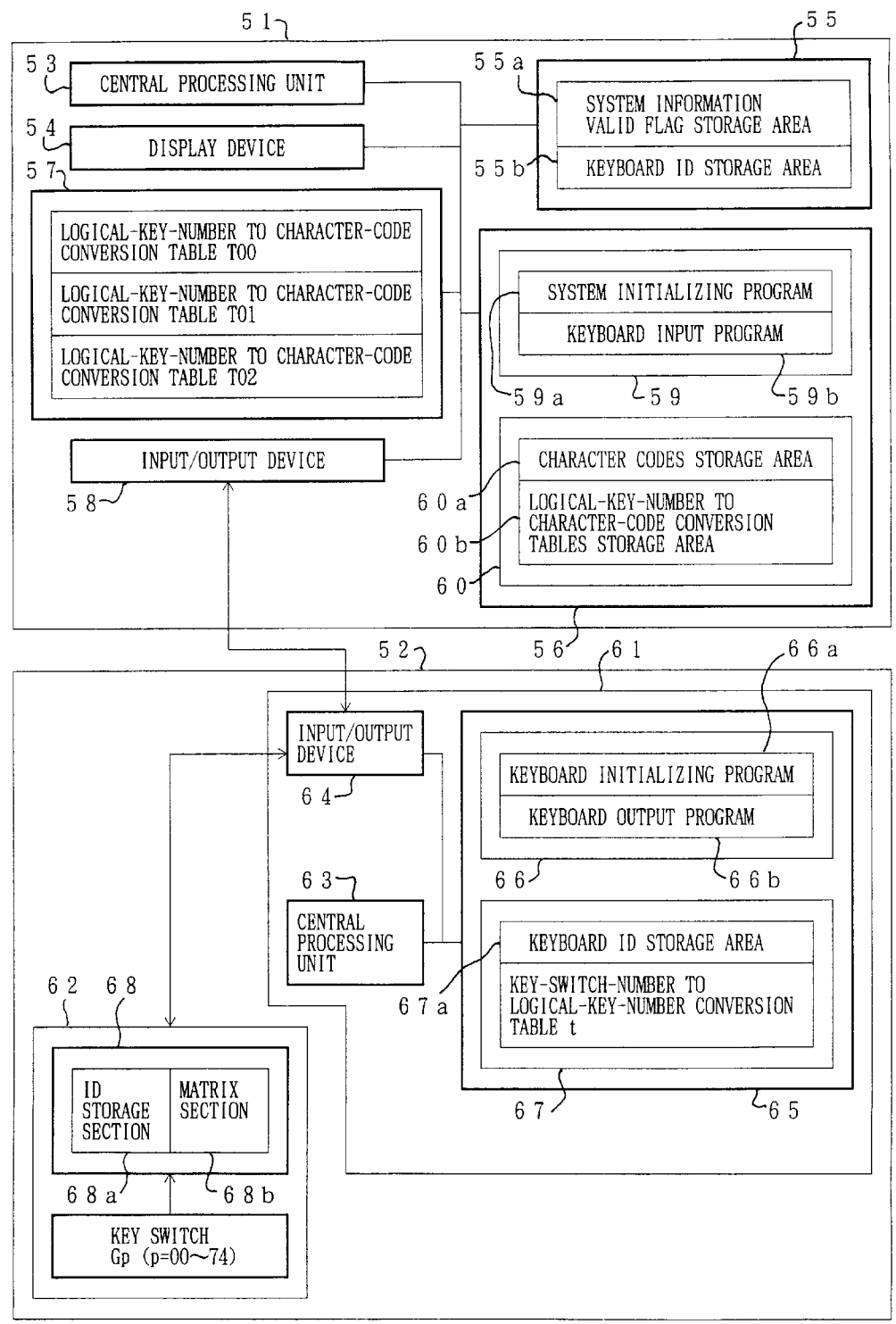
FIG. 24 is a block diagram showing the system structure of a conventional personal computer.

In both of Embodiments 1 and 2, the keyboard matrix 22a of each keyboard has basically the same structure. As shown in FIG. 20, all of the keyboards include 8 key return lines R0 to R7, and 10 key scanning lines C0 to C9. The number of the key scanning lines in the keyboard matrix of Embodiment 2 is one line less than that in the keyboard matrix of embodiment 1. However, the keyboard matrix of this embodiment has the same structure as the keyboard matrix of ordinary keyboards. Therefore, conversion tables t00' to t02' corresponding to the respective keyboard ID values are those shown in FIGS. 21 to 23, respectively.

More specifically, Embodiment 2 is the same as embodiment 1 in respect of the structure that the logical key number K01 corresponds to the key [F1] used for distinguishing keyboards. However, the logical key switch number Gp corresponding to the logical key number K01, i.e., the key switch position CiRj, varies. When keyboards have keyboard ID values 00, 01 and 02, the logical key number K01 corresponds to the key switch numbers G01, G02 and G03, respectively.

Hence, when the scanning of the key scanning line C0 is performed by the depression of the key [F1], a signal is returned from either of the key return lines R1, R2 and R3 depending on the type of the keyboard, thereby identifying the keyboard.

The operation of detecting the keyboard performed when power is supplied to the personal computer of Embodiment 2 can be explained by replacing the key return lines R0, R1 and R2 in the steps S14, S16 and S18 shown in FIG. 15 of embodiment 1 with R1, R2 and R3, respectively, and by replacing the maximum number of i in S25 shown in FIG. 16 with 10.

In this case, even if the mechanical and electrical structures of keyboards used are exactly the same, it is possible to distinguish the keyboards by changing the relationship between the key switch numbers Gp and the logical key numbers Kg in the conversion tables t. Therefore, for example, it is possible to produce keyboards having different key arrangements for individual countries by changing the characters printed on the top of the keys and providing corresponding conversion tables T and t.

As described above, in Embodiment 2, unlike embodiment 1, the logical key number corresponding to a predetermined key switch used for distinguishing keyboards is varied. This arrangement allows a single keyboard controller to be compatible with more than one type of keyboard without providing an additional part equivalent to the conventional memory area. Namely, in this arrangement, it is possible to provide an information processing apparatus capable of using more than one type of keyboard with a single keyboard controller without increasing the production cost.

As explained in the section of Embodiments 1 and 2 above, in the information processing apparatus of the present invention, the keyboards 22 of different key arrangements can be connected to the keyboard device 2, and the specific key which is common to the respective keyboards 22 is positioned so that the key scanning line Ci is connected to the key return line Rj at the key switch position CiRj, which varies according to the types of keyboards 22, on the keyboard matrix 22a. Moreover, the types of the keyboards 22 are identified by detecting the position of a key switch which is being depressed, based on whether the key scanning line Ci is connected to the key return line Rj.

With this structure, since the combination of the key scanning line Ci and the key return line Rj which are connected to each other when the specific key is depressed varies according to the types of keyboards 22, it is possible to obtain different signals from the respective keyboards 22. Consequently, the keyboards 22 can be distinguished based on the signals. Therefore, it is not necessary for the keyboard 22 to have a structure for identifying the keyboard 22, for example, for outputting the keyboard ID. Namely, it is possible to provide an information processing apparatus capable of using more than one type of keyboard with a single keyboard controller without increasing the production cost (at low costs).

Moreover, in order to output the logical key numbers K00 to K74, the keyboard controller 21 includes the data storage area 27 storing the conversion tables t (key-switch-number to logical-key-number conversion tables). The data storage area 27 stores a plurality of conversion tables t00 to t02 (conversion tables t) corresponding to the keyboards 22, respectively. The information processing apparatus of the present invention outputs the logical key numbers K00 to K74 corresponding to the key switch positions CiRj based on a conversion table t which is selected according to a signal which is obtained when the specific key is depressed.

In this structure, the keyboard controller 21 uses any of the conversion tables t00 to t02, corresponding to the detected keyboard type. Therefore, the depressed key is correctly converted into the corresponding character code according to the keyboard connected. Thus, a single keyboard controller 21 can be made compatible with a plurality of keyboards 22. In this case, in order to identify the keyboard, for example, such a program that causes the specific key to be depressed when the information processing apparatus is activated is operated.

Furthermore, the information processing apparatus of the present invention outputs character codes corresponding to the logical key numbers K00 to K74 based on a conversion table T (logical-key-number to character-code conversion table) selected according to the type of the keyboard.

With this structure, the transmission of signals between the keyboard device 2 and the system device 1 is standardized by the logical key numbers. Therefore, even if the keyboard device 2 has not only a different key arrangement but also a different physical arrangement of the keyboard matrix 22a, the keyboard device 2 can be connected to the system device 1 by converting signals through the conversion tables t and T.

In addition, in the information processing apparatus of the present invention, the key scanning line Ci can be connected to any one of the key return lines Rj on the keyboard matrix 22a through only a key switch position CiRj corresponding to the specific key.

With this structure, it is possible to locate the key switch corresponding to the specific key on different key switch positions according to the number of key return lines by only providing an additional key scanning line exclusively for the specific key. Namely, it is possible to distinguish the same number of keyboard ID values as the number of key return lines Rj.

Moreover, in the information processing apparatus of the present invention, the key switch position CiRj corresponding to the specific key can be changed, and the conversion tables t are arranged so that the relationship between the logical key numbers K00 to K74 of the respective conversion tables t and the specific key becomes uniform.

In this arrangement, by varying the key switch position CiRj corresponding to the specific key according to each keyboard, the same character code is obtained when the specific key is depressed, but the key switch position CiRj obtained by the depression of the specific key varies according to the types of keyboards. It is thus possible to distinguish a keyboard ID.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information processing apparatus comprising:
   a keyboard device including a keyboard as input means and a keyboard controller,
   said keyboard comprising a plurality of keys, and a keyboard matrix comprising a plurality of key scanning lines and a plurality of key return lines arranged in a matrix pattern, and key switches formed at intersections of said key scanning lines and said key return lines so as to correspond to said keys, respectively,
   said keyboard controller outputting logical key numbers corresponding to key switch positions on said keyboard, respectively; and
   a system device for outputting character codes corresponding to the logical key numbers, respectively,
   wherein said keyboard device permits connection of keyboards having different key arrangements thereto,
   wherein a specific key which is common to said keyboards having a different key arrangement is arranged so that one of said key scanning lines corresponding to said specific key is connected to said key return line at a key switch position which varies according to each keyboard, and
   wherein said key scanning line is connected to any one of said key return lines on said keyboard matrix only at a key switch position corresponding to said specific key.

2. The information processing apparatus as set forth in claim 1,
   wherein a type of said keyboard is identified by depressing said specific key and detecting which key return line is connected to the key scanning line corresponding to said specific key.

3. The information processing apparatus as set forth in claim 1,
   wherein said keyboard controller comprises first memory means storing a key-switch-number to logical-key-number conversion table so as to output the logical key numbers.

4. The information processing apparatus as set forth in claim 3,
   wherein said first memory means stores a plurality of key-switch-number to logical-key-number conversion tables corresponding to said keyboards having different key arrangements.

5. The information processing apparatus as set forth in claim 4,
   wherein logical key numbers corresponding to key switch positions are output based on one of said key-switch-number to logical-key-number conversion tables, which is selected according to a signal obtained by depressing said specific key.

6. The information processing apparatus as set forth in claim 1,
   wherein said system device comprises second memory means storing a logical-key-number to character-code conversion table so as to output the character codes.

7. The information processing apparatus as set forth in claim 6,
   wherein said second memory means stores a plurality of logical-key-number to character-code conversion tables corresponding to said keyboards having different key arrangements.

8. The information processing apparatus as set forth in claim 7,
   wherein character codes corresponding to logical key numbers are output based on said logical-key-number to character-code conversion tables, which are selected according to types of said keyboards.

9. The information processing apparatus as set forth in claim 1,
   wherein the key switch position corresponding to said specific key is changeable.

10. An information processing apparatus comprising:
    a keyboard device including a keyboard as input means and a keyboard controller,
    said keyboard comprising a plurality of keys, and a keyboard matrix comprising a plurality of key scanning lines and a plurality of key return lines arranged in a matrix pattern, and key switches formed at intersections of said key scanning lines and said key return lines so as to correspond to said keys, respectively,
    said keyboard controller outputting logical key numbers corresponding to key switch positions on said keyboard, respectively; and a system device for outputting character codes corresponding to the logical key numbers, respectively, wherein said keyboard device permits connection of keyboards having different key arrangements thereto, wherein a specific key which is common to said keyboards having a different key arrangement is arranged so that one of said key scanning lines corresponding to said specific key is connected to said key return line at a key switch position which varies according to each keyboard, and wherein the key switch position corresponding to said specific key is changeable.

11. The information processing apparatus as set forth in claim 10, wherein a type of said keyboard is identified by depressing said specific key and detecting which key return line is connected to the key scanning line corresponding to said specific key.

12. The information processing apparatus as set forth in claim 10, wherein said keyboard controller comprises first memory means storing a key-switch-number to logical-key-number conversion table so as to output the logical key numbers.

13. The information processing apparatus as set forth in claim 12, wherein said first memory means stores a plurality of key-switch-number to logical-key-number conversion tables corresponding to said keyboards having different key arrangements.

14. The information processing apparatus as set forth in claim 13, wherein logical key numbers corresponding to key switch positions are output based on one of said key-switch-number to logical-key-number conversion tales, which is selected according to a signal obtained by depressing said specific key.

15. The information processing apparatus as set forth in claim 10, wherein said system device comprises second memory means storing a logical-key-number to character-code conversion table so as to output the character codes.

16. The information processing apparatus as set forth in claim 15, wherein said second memory means stores a plurality of logical-key-number to character-code conversion tables corresponding to said keyboards having different key arrangements.

17. The information processing apparatus as set forth in claim 16, wherein character codes corresponding to logical key numbers are output based on said logical-key-number to character-code conversion tables, which are selected according to types of said keyboards.

* * * * *